United States Patent
Kono et al.

(10) Patent No.: US 7,194,999 B2
(45) Date of Patent: Mar. 27, 2007

(54) COMBUSTION CONTROL APPARATUS FOR DIRECT-INJECTION SPARK-IGNITION INTERNAL COMBUSTION ENGINE

(75) Inventors: Toshiya Kono, Yokohama (JP); Hitoshi Ishii, Kanagawa (JP); Mitsuhiro Akagi, Yokohama (JP); Katsuaki Uchiyama, Yokohama (JP); Masayuki Tomita, Kanagawa (JP); Akira Nakajima, Yokohama (JP); Taro Sakai, Kawasaki (JP); Masatoshi Hidaka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/189,058

(22) Filed: Jul. 26, 2005

(65) Prior Publication Data

US 2006/0016425 A1     Jan. 26, 2006

(30) Foreign Application Priority Data

| | | | |
|---|---|---|---|
| Jul. 26, 2004 | (JP) | ............................. | 2004-216747 |
| Aug. 3, 2004 | (JP) | ............................. | 2004-226240 |
| Aug. 3, 2004 | (JP) | ............................. | 2004-226241 |
| Sep. 24, 2004 | (JP) | ............................. | 2004-276330 |
| Dec. 9, 2004 | (JP) | ............................. | 2004-356140 |
| Dec. 13, 2004 | (JP) | ............................. | 2004-359282 |
| Dec. 21, 2004 | (JP) | ............................. | 2004-368605 |
| Dec. 24, 2004 | (JP) | ............................. | 2004-372472 |

(51) Int. Cl.
*F02P 5/00*  (2006.01)
*F02B 17/00*  (2006.01)

(52) U.S. Cl. ................................. 123/406.47; 123/295

(58) Field of Classification Search ........... 123/406.47, 123/406.44, 406.53, 406.55, 295, 300, 305, 123/299
See application file for complete search history.

(56) References Cited

U.S. PATENT DOCUMENTS

| | | | | |
|---|---|---|---|---|
| 5,865,153 | A | * | 2/1999 | Matsumoto .................. 123/299 |
| 6,112,716 | A | * | 9/2000 | Tachibana .................... 123/305 |
| 6,684,630 | B2 | * | 2/2004 | Uchida et al. ................ 60/284 |
| 6,725,649 | B2 | * | 4/2004 | Yamashita et al. ............ 60/284 |
| 6,751,948 | B2 | | 6/2004 | Takemura et al. |

(Continued)

FOREIGN PATENT DOCUMENTS

EP    1 243 770 A1    9/2002

(Continued)

OTHER PUBLICATIONS

U.S. Appl. No. 11/038,643, filed Jan. 21, 2005, Ishii et al.

(Continued)

*Primary Examiner*—Mahmoud Gimie
(74) *Attorney, Agent, or Firm*—Foley & Lardner LLP

(57) ABSTRACT

A combustion control apparatus configured to operate a direct-injection spark-ignition internal combustion engine in a top dead center injection operating mode. In the top dead center injection operating mode, a fuel injection start timing is set to be before compression top dead center, a fuel injection end timing is set to be after compression top dead center, and an ignition timing is set to be after compression top dead center. The combustion control apparatus is configured to promote incylinder fuel spray penetration.

17 Claims, 25 Drawing Sheets

U.S. PATENT DOCUMENTS

| | | | |
|---|---|---|---|
| 6,772,585 B2* | 8/2004 | Iihoshi et al. | 60/277 |
| 6,880,518 B2* | 4/2005 | Shiraishi et al. | 123/295 |
| 6,895,933 B2* | 5/2005 | Miwa et al. | 123/406.47 |
| 2003/0217733 A1* | 11/2003 | Shiraishi et al. | 123/295 |

FOREIGN PATENT DOCUMENTS

| | | |
|---|---|---|
| EP | 1 258 622 A2 | 11/2002 |
| GB | 2 301 459 A | 12/1996 |
| JP | 09-151777 A | 6/1997 |
| JP | 2004-036461 A | 2/2004 |

OTHER PUBLICATIONS

U.S. Appl. No. 11/038,645, filed Jan. 21, 2005, Tomita.
U.S. Appl. No. 11/189,128, filed Jul. 26, 2005, Kono et al.

* cited by examiner

COMBUSTION CONTROL APPARATUS FOR DIRECT-INJECTION SPARK-IGNITION INTERNAL COMBUSTION ENGINE

BACKGROUND OF THE INVENTION

The present invention relates generally to combustion control apparatus for direct-injection spark-ignition internal combustion engine, and more particularly to combustion control apparatus for controlling a fuel injection timing and an ignition timing of a direct-injection spark-ignition internal combustion engine.

A Published Japanese Patent Application No. 2001-336467 (hereinafter referred to as "JP2001-336467") shows a direct-injection spark-ignition internal combustion engine which includes a catalytic converter in its exhaust passage. When the catalytic converter is desired to be warmed up, fuel is injected on the compression stroke, and the ignition timing is set to be after compression top dead center (TDC).

SUMMARY OF THE INVENTION

In a common direct-injection spark-ignition internal combustion engine, in order to increase an exhaust gas temperature for rapid activation of a catalyst and to reduce engine-out hydrocarbon (HC) exhaust emissions during the engine being in cold conditions, the ignition timing is desired to retard as late as possible. However, a large delay in the ignition timing tends to adversely affect combustion stability of the engine. Accordingly, the ignition timing is constrained within bounds determined in terms of the combustion stability. In the engine disclosed in JP2001-336467, it is possible that combustion stability is low with the ignition timing being late, especially during the engine being in cold conditions, and thereby that the later bound of the ignition timing is not so late. Therefore, it is possible that the ignition timing cannot be set to be late as desired.

Accordingly, it is an object of the present invention to provide a combustion control apparatus which rapidly and stably warms up a direct-injection spark-ignition internal combustion engine.

According to one aspect of the present invention, a combustion control apparatus for an internal combustion engine including a combustion chamber, comprises: a fuel injector configured to inject fuel into the combustion chamber from a fuel injection start timing to a fuel injection end timing; a spark plug configured to produce a spark in the combustion chamber at an ignition timing; and a control unit connected to the fuel injector and the spark plug, for performing the following in a top dead center injection operating mode under a predetermined engine operating condition: setting the fuel injection start timing to be before compression top dead center; setting the fuel injection end timing to be after compression top dead center; setting the ignition timing to be after compression top dead center; and performing a penetration control operation of adjusting engine operating parameters of the engine to promote spray penetration of the fuel in the combustion chamber.

According to another aspect of the invention, a combustion control apparatus for an internal combustion engine including a combustion chamber, comprises: fuel injection means for injecting fuel into the combustion chamber from a fuel injection start timing to a fuel injection end timing; spark means for producing a spark in the combustion chamber at an ignition timing; and control means for performing the following in a top dead center injection operating mode under a predetermined engine operating condition: setting the fuel injection start timing to be before compression top dead center; setting the fuel injection end timing to be after compression top dead center; setting the ignition timing to be after compression top dead center; and performing a penetration control operation of adjusting engine operating parameters of the engine to promote spray penetration of the fuel in the combustion chamber.

According to a further aspect of the invention, a method of controlling an internal combustion engine including a combustion chamber, a fuel injector configured to inject fuel into the combustion chamber from a fuel injection start timing to a fuel injection end timing, and a spark plug configured to produce a spark in the combustion chamber at an ignition timing, comprises: performing the following in a top dead center injection operating mode under a predetermined engine operating condition: setting the fuel injection start timing to be before compression top dead center; setting the fuel injection end timing to be after compression top dead center; setting the ignition timing to be after compression top dead center; and performing a penetration control operation of adjusting engine operating parameters of the engine to promote spray penetration of the fuel in the combustion chamber.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1A:
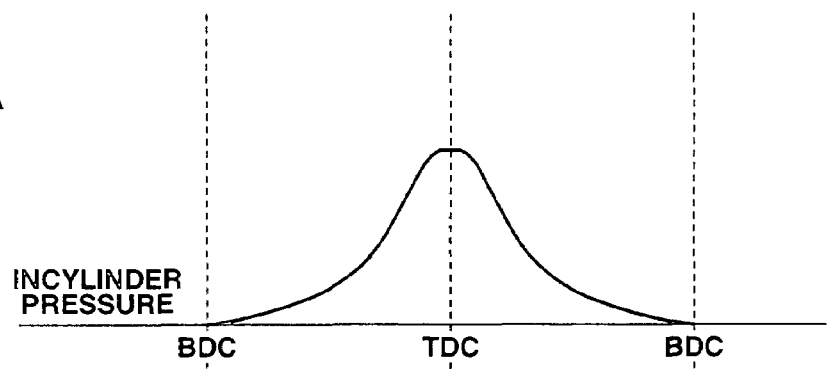
FIGS. 1A through 1C illustrate a TDC injection operating mode in which a combustion control apparatus in accordance with an embodiment of the present invention operates a direct-injection spark-ignition internal combustion engine.
Figure 1B:
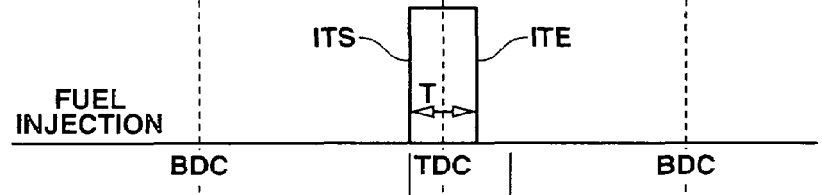
Figure 1C:
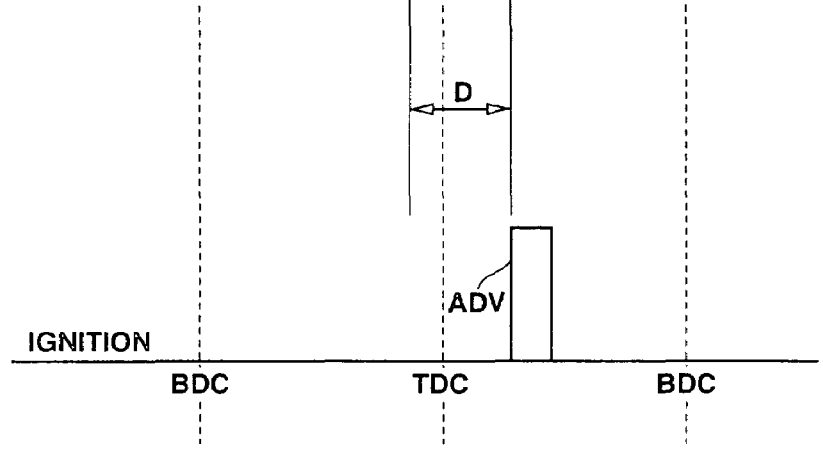

FIGS. 1A through 1C illustrate a TDC injection operating mode in which a combustion control apparatus in accordance with an embodiment of the present invention operates a direct-injection spark-ignition internal combustion engine. FIG. 1A illustrates how an incylinder pressure varies with respect to a crank angle in the TDC injection operating mode. FIG. 1B illustrates how fuel injection take places with respect to the crank angle in the TDC injection operating mode. FIG. 1C illustrates how ignition take places with respect to the crank angle in the TDC injection operating mode. As shown in FIG. 1B, a fuel injection start timing ITS is set to be before compression TDC, a fuel injection end timing ITE is set to be after compression TDC. A fuel injection quantity is proportional to a fuel injection duration T from fuel injection start timing ITS to fuel injection end timing ITE. An ignition timing ADV is set to be after compression TDC. Specifically, ignition timing ADV is delayed with respect to fuel injection start timing ITS by a predetermined lag D of 10° CA to 25° CA. In general, ignition lag or ignition delay D is in correlation to the distance from a fuel injection valve to a spark plug.

Figure 2:
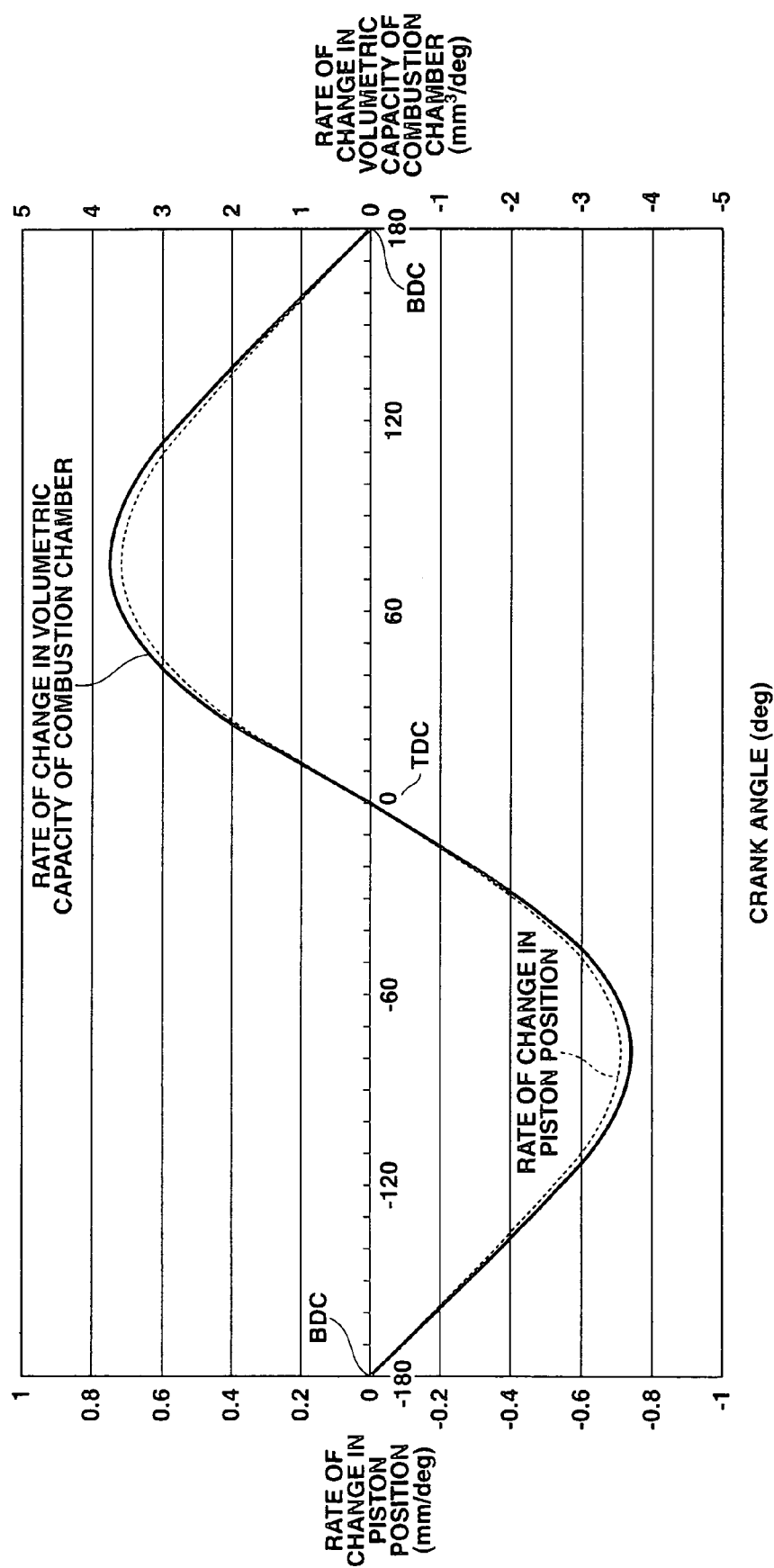
FIG. 2 illustrates how a rate of change in the position of a piston and a rate of change in the volumetric capacity of a combustion chamber vary with respect to a crank angle in a reciprocating engine.

FIG. 2 illustrates how a rate of change in the position of a piston and a rate of change in the volumetric capacity of a combustion chamber vary with respect to a crank angle in one cycle in a reciprocating engine. As shown in FIG. 2, the rates of change are large at a midpoint of the stroke of the piston, and are small at or near TDC and bottom dead center (BDC). Accordingly, in the TDC injection operating mode, fuel is injected under a condition in which the rate of change in the piston position and the rate of change of the volumetric capacity of the combustion chamber are at or near zero. Therefore, the combustion chamber provides a stable flow field under little influence of the piston motion.

Figure 3:
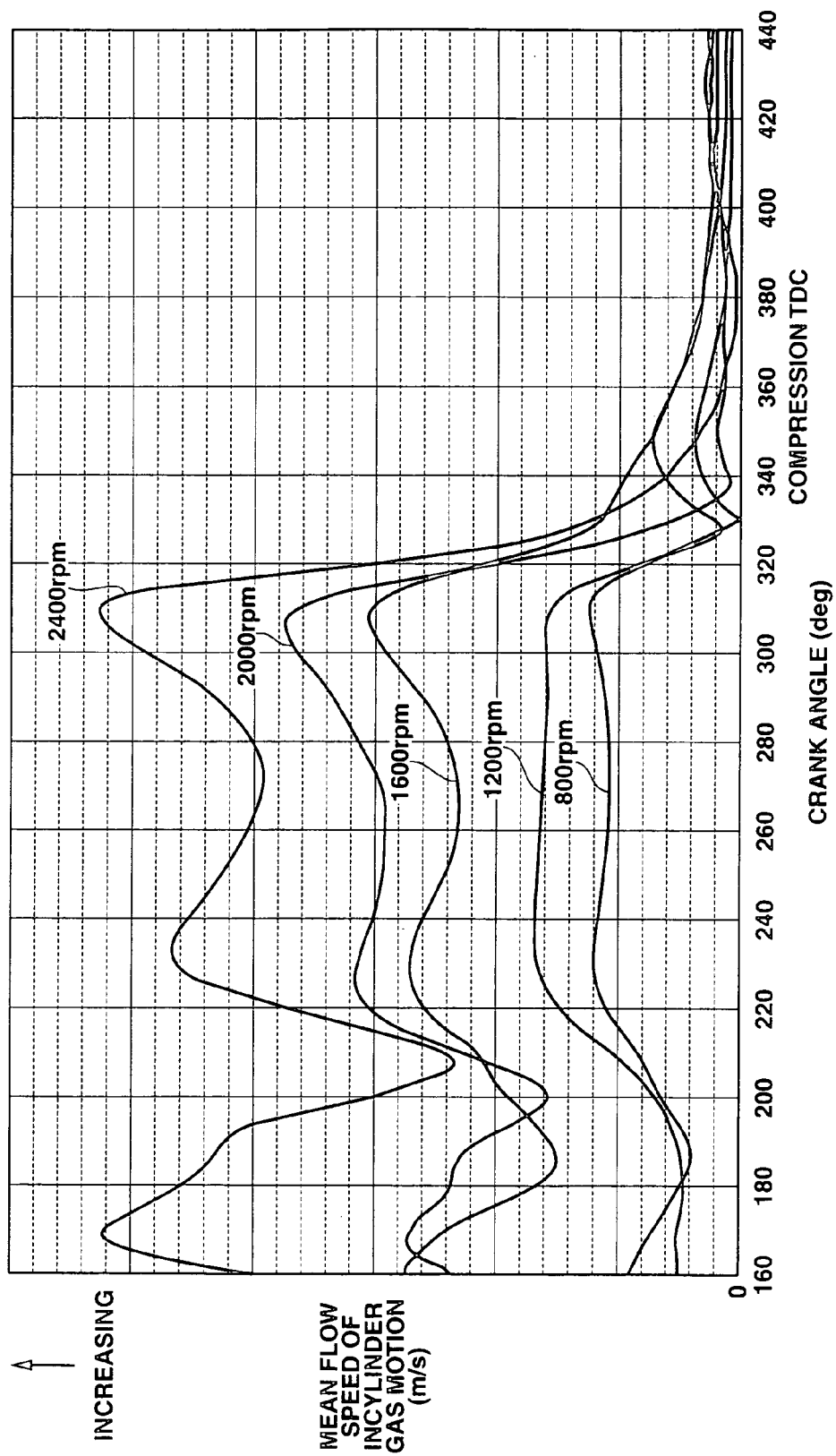
FIG. 3 illustrates how a mean flow speed of incylinder gas motion varies with respect to a crank angle in a direct-injection spark-ignition internal combustion engine.

On the intake stroke, air flows into the combustion chamber to generate incylinder gas motion. The incylinder gas motion includes large-scale flows such as swirls or tumbles whose mean flow speeds are relatively large. These large-scale flows are also present on the compression stroke. When the piston travels to be at or near TDC so that the volumetric capacity of the combustion chamber is small, the large-scale flows such as swirls or tumbles begin to break down or disintegrate. FIG. 3 shows a speed of the large-scale flows, such as the average speed of large-scale flows, or the mean flow speed of the incylinder gas motion in the combustion chamber under several engine speeds. As shown in FIG. 3, the large-scale flows such as swirls or tumbles rapidly disintegrate around 320° CA, before compression TDC (360° CA). Thus, the mean flow speed is small around compression TDC. Accordingly, the fuel spray produced around a spark plug at compression TDC in the TDC injection operating mode is not moved by the large-scale flows. Therefore, a desired fuel spray is formed around the spark plug in the TDC injection operating mode in accordance with the embodiment of the present invention.

Figure 4:
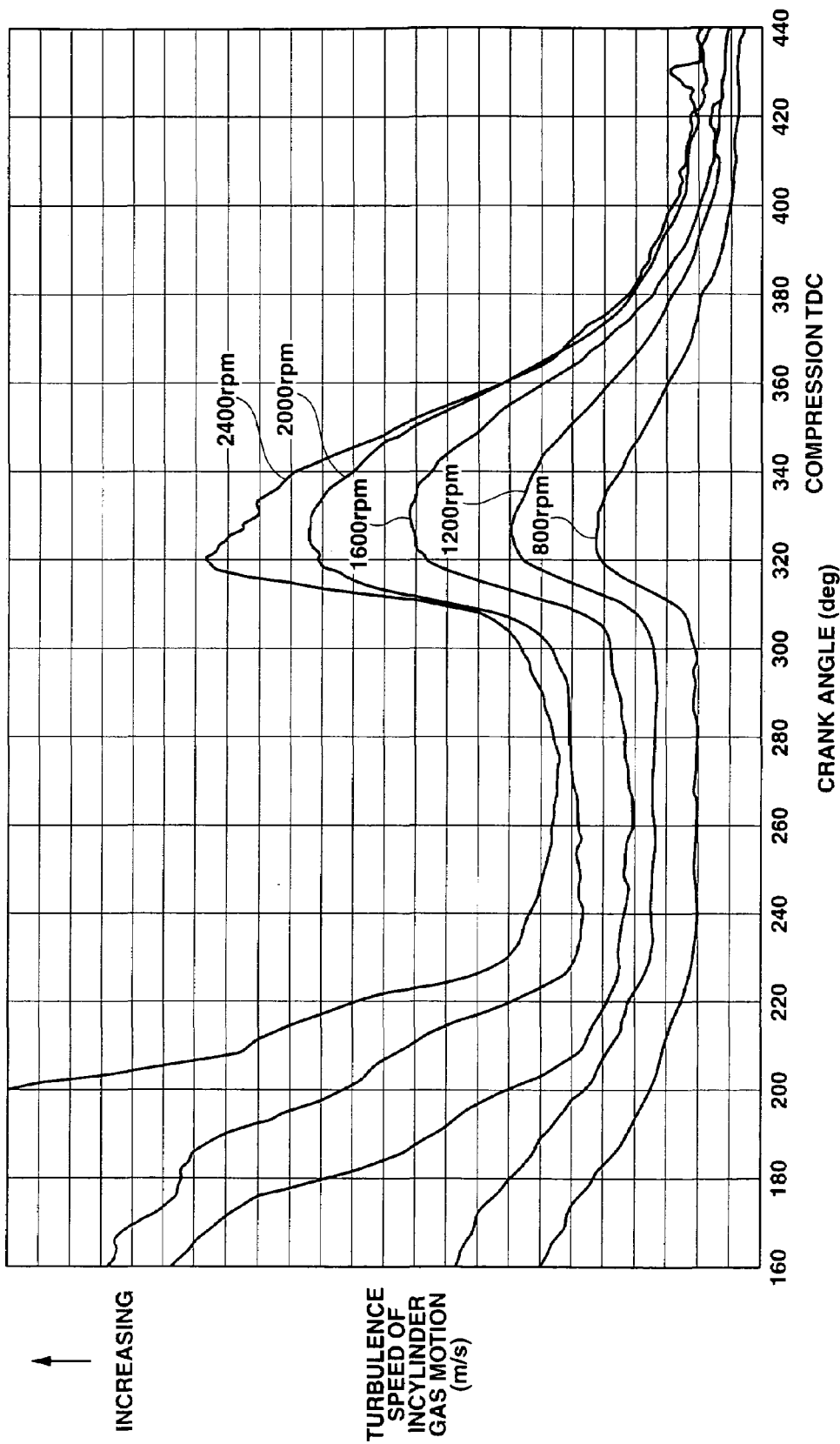
FIG. 4 illustrates how a turbulence speed of incylinder gas motion varies with respect to a crank angle in a direct-injection spark-ignition internal combustion engine.

When the large-scale flows such as swirls or tumbles disintegrate, the kinematical energy of the large-scale flows is transferred to small turbulence flows. Accordingly, the turbulence in the incylinder gas motion in the combustion chamber increases rapidly just before compression TDC, as shown in FIG. 4. FIG. 4 shows an equivalent flow speed into which the turbulence in the incylinder gas motion is converted, called a turbulence speed. The turbulence serves to activate the combustion field in the combustion chamber, and thereby to improve the incylinder combustion.

As mentioned above, there is no large-scale flow flowing fuel spray in the combustion chamber at or near compression TDC. In addition, there is a large turbulence in the incylinder gas motion at or near compression TDC, serving to activate the incylinder combustion. Furthermore, the flow field is stable at or near compression TDC, because the piston motion is very small. Therefore, in the TDC injection operating mode, the incylinder combustion is stable even if the ignition timing is after compression TDC. The allowable latest ignition timing that the incylinder combustion is stable may be retarded later in the TDC injection operating mode. A late ignition timing serves to rapidly increase the exhaust gas temperature and to reduce the amount of engine-out HC emissions.

Figure 6:
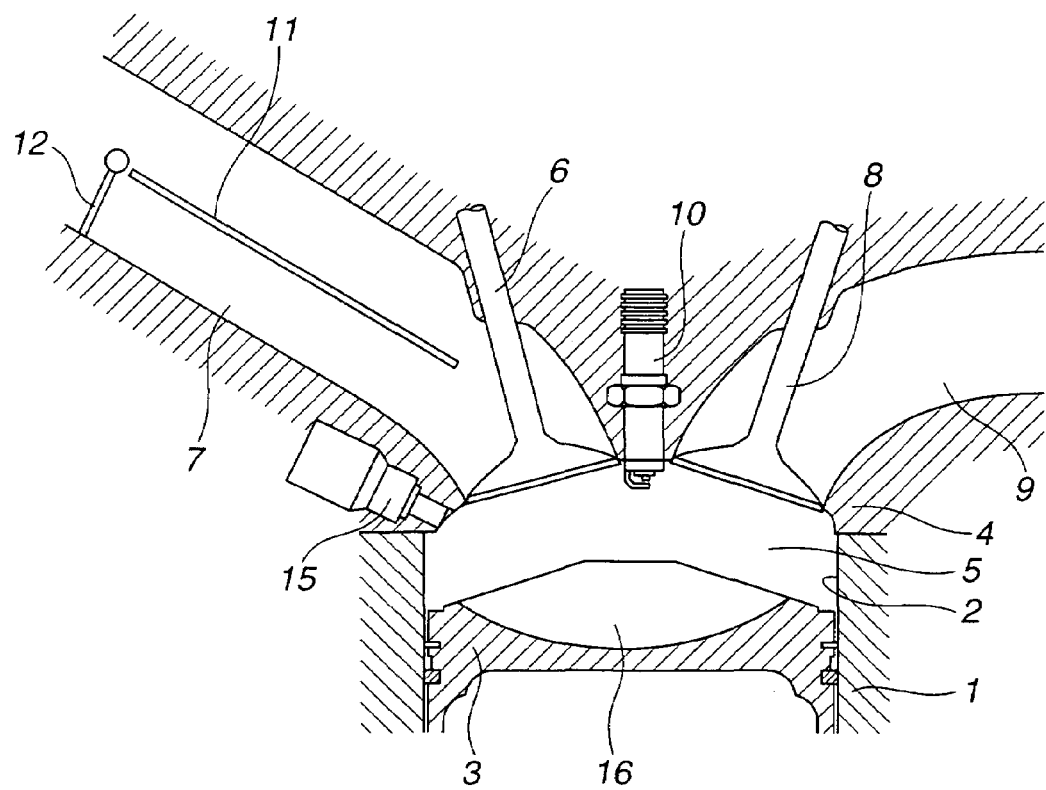
FIG. 6 is a side sectional view of a direct-injection spark-ignition internal combustion engine with a combustion control apparatus in accordance with an embodiment of the present invention.
Figure 7:
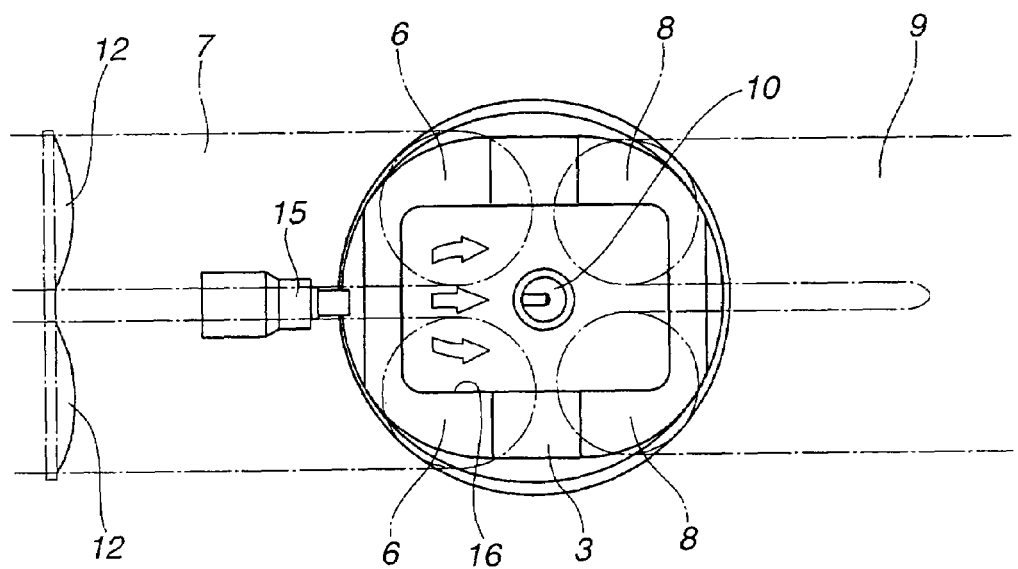
FIG. 7 is a top sectional view of the engine of FIG. 6.
Figure 8:
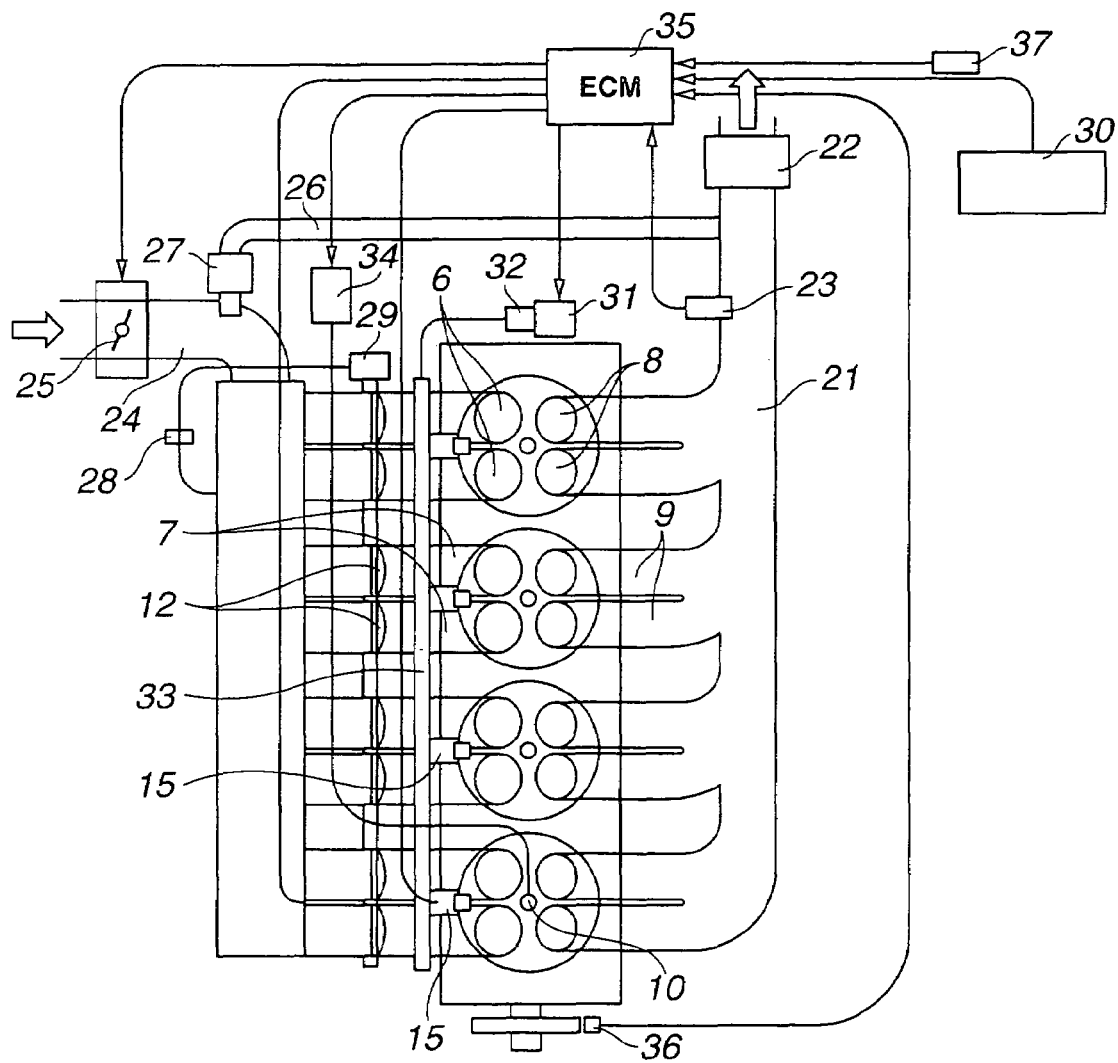
FIG. 8 is a schematic diagram depicting a direct-injection spark-ignition internal combustion engine with a combustion control apparatus in accordance with a first embodiment of the present invention.
Figure 9:
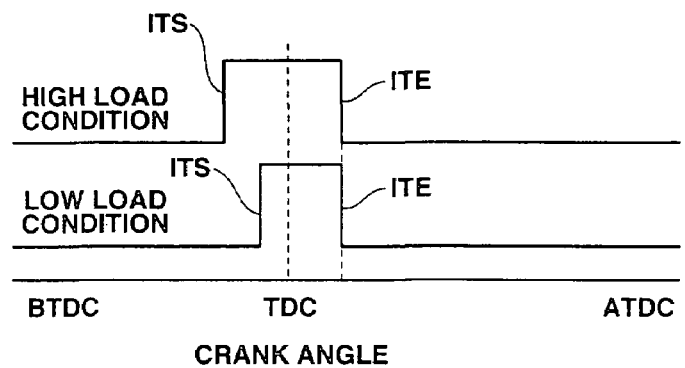
FIG. 9 illustrates how a fuel injection start timing ITS varies with a change in an engine load of the engine of FIG. 8.

Referring now to FIGS. 6 through 8, there is shown an in-line four cylinder direct-injection spark-ignition internal combustion engine with a combustion control apparatus in accordance with an embodiment of the present invention. FIG. 6 is a side sectional view of each of the engine cylinders. FIG. 7 is a top sectional view of each of the engine cylinders. As shown in FIGS. 6 and 7, a piston 3 is slidably mounted in each cylinder 2 formed in a cylinder block 1. Cylinder block 1 is coupled to a cylinder head 4. The undersurface of cylinder head 4, the piston crown of piston 3, and the side wall of cylinder 2, forms a combustion chamber 5. A portion of the undersurface of cylinder head 4 which faces combustion chamber 5 or serves to form the top portion of combustion chamber 5 includes a recessed portion formed into a pent-roof shape including a pair of inclined surfaces. The inclined surface of the pent-roof shaped portion on the intake side (on the left side in FIG. 6) includes a pair of portions each defining the opening of an intake port 7. The other inclined surface of the pent-roof shaped portion on the exhaust side includes a pair of portions each defining the opening of an exhaust port 9. At each of the openings of intake ports 7 is provided an intake valve 6. At each of the openings of exhaust ports 9 is provided an exhaust valve 8. Intake valve 6 is actuated by an intake cam machined as an integral part of an intake camshaft, to change the opening of intake port 7. Exhaust valve 8 is actuated by-an exhaust cam machined as an integral part of an exhaust camshaft, to change the opening of exhaust port 7. A spark plug 10 is mounted at the apex of the pent-roof shaped portion of cylinder head 4, that is, disposed in a portion of the undersurface of cylinder head 4 surrounded by two intake valves 6 and two exhaust valves 8. Thus, spark plug 10 is configured to produce a spark in combustion chamber 5 at ignition timing ADV. A division wall 11 and a tumble control valve 12 are provided to control tumble flows in the intake air in accordance with the engine operating condition. Division wall 11 is disposed extending along intake port 7, dividing intake port 7 into an upper and a lower passage. Tumble control valve 12 is configured to open and close the lower passage of intake port 7. When tumble control valve 12 is regulated to close the lower passage of intake port 7, the tumble flows are strengthened. Conversely, when tumble control valve 12 is regulated to open the lower passage of intake port 7, the tumble flow is weakened. The engine may be configured without tumble control valve 12, or provided with an alternative type of tumble control valve.

A fuel injection valve 15 as a fuel injector is disposed in cylinder head 4, facing combustion chamber 5. Specifically, fuel injection valve 15 is disposed under the openings of intake ports 7 to combustion chamber 5. In the top view of FIG. 7, fuel injection valve 15 is disposed between the two openings of intake ports 7. Fuel injection valve 15 is located on the intake side of combustion chamber 5, with the inward end portion oriented normal to the piston pin, in the top view. In the side view of FIG. 6, the longitudinal axis of fuel injection valve 15 is slightly inclined, extending slightly downward. This inclination is small so that fuel injection valve 15 injects or sprays fuel substantially in the horizontal direction. Thus, fuel injection valve 15 is configured to inject fuel directly into combustion chamber 5 from fuel injection start timing ITS to fuel injection end timing ITE.

The piston crown of piston 3 includes an outer (peripheral) portion formed to fit the pent-roof shaped recessed portion of the undersurface of cylinder head 4, and a central cavity 16. Cavity 16 has a rectangular shape whose center is located substantially at the center of piston crown, in the top view of FIG. 7. The bottom portion of cavity 16 is formed into a cylindrical shape curved on an axis along the piston pin so that the tumble flows along the curved face.

FIG. 8 is a schematic diagram depicting an in-line four cylinder direct-injection spark-ignition internal combustion engine with a combustion control apparatus in accordance with a first embodiment of the present invention. As shown in FIG. 8, exhaust ports 9 of the engine cylinders are connected to an exhaust-gas passage 21. At a downstream portion of exhaust-gas passage 21 is disposed a catalytic converter 22. Upstream of catalytic converter 22 is disposed an air-fuel ratio sensor 23 such as an oxygen sensor. Intake ports 7 of the engine cylinders are connected to an intake-air passage 24. At an upstream portion of intake-air passage 24 is disposed an electronically-controlled throttle valve 25. Between exhaust-gas passage 21 and intake-air passage 24 is disposed an exhaust gas recirculation (EGR) passage 26. An EGR valve 27 is disposed in EGR passage 26. Tumble control valves 12 are actuated as one unit by a tumble control actuator 29. Tumble control actuator 29 is energized by intake negative pressure via a solenoid valve 28.

A fuel pump 31 and a pressure regulator 32 is provided to regulate the pressure of the fuel and to supply the fuel through a fuel gallery 33 to fuel injection valve 15. Receiving a control pulse signal, fuel injection valve 15 opens to spray the fuel into combustion chamber 5. The fuel injection quantity is adjusted in accordance with the opening duration of fuel injection valve 15. Spark plug 10 of each engine cylinder is connected electrically to an ignition coil 34.

An electrical control unit 35 as an engine control module (ECM) includes a microcomputer, its peripheral devices, and a current control device. Specifically, control unit 35 includes an input/output interface (I/O), memories (RAM, ROM), and a microprocessor or a central processing unit (CPU). The input/output interface (I/O) of control unit 35 receives input information, i.e. sensing signals from sensors, namely, an accelerator opening sensor 30, a crank angle sensor 36, an air-fuel ratio sensor 23, and a coolant temperature sensor 37. Accelerator opening sensor 30 is configured to measure the depression of the accelerator pedal. Crank angle sensor 36 is configured to measure the crank angle of the crankshaft. Air-fuel ratio sensor 23 is configured to measure the air-fuel ratio of the exhaust gas. Coolant temperature sensor 37 is configured to measure a temperature of the coolant. Within control unit 35, the central processing unit (CPU) allows the access by the I/O interface of input data signals from the sensors. The CPU of control unit 35 is responsible for carrying the fuel-injection/ignition-timing/throttle control program stored in the memories and is capable of performing necessary arithmetic and logic operations. Concretely, based on the input information, a fuel-injection timing, a fuel-injection quantity, and a fuel-injection rate, of fuel injection valve 15 of each engine cylinder are controlled by an electronic fuel-injection control system. An ignition timing of spark plug 10 of each engine cylinder is controlled by an electronic ignition system. The throttle opening of throttle valve 25 is controlled by an electronic throttle control system. Computational results, that is, calculated output signals are relayed through the output interface circuitry of control unit 35 to output stages through the current control device.

The engine configured as described above is operated in a normal operating mode including a normal stratified charge combustion mode, and a homogeneous charge combustion mode, when the engine is in warmed-up conditions.

Under low-speed and low-load conditions after the warming-up, the engine is controlled in the normal stratified charge combustion mode. In the normal stratified charge combustion mode, tumble control valve 12 is basically closed. Fuel is injected at a proper timing on the compression stroke. The ignition timing is before compression TDC. The fuel injection is completed before compression TDC. After the fuel is sprayed during the compression stroke, the fuel spray flows along with the tumble flowing along cavity 16 toward around spark plug 10. The relatively rich air-fuel mixture is formed around spark plug 10 and ignited by spark plug 10. Thus, in the normal stratified charge combustion mode, the engine performs stratified charge combustion that the overall air-fuel ratio is lean.

Under high-speed and high-load conditions after the warming-up, the engine is controlled in the homogeneous charge combustion mode. In the homogeneous charge combustion mode, tumble control valve 12 is basically open. Fuel is injected on the intake stroke. The ignition timing is a MBT (minimum advance for best torque) point before compression TDC. Thus, in the homogeneous charge combustion mode, the fuel in combustion chamber 5 is homogeneous and the overall air-fuel ratio is basically at or near the stoichiometric air-fuel ratio.

On the other hand, when the engine is in cold conditions, the engine is basically operated in a TDC injection operating mode, in order to activate catalytic converter 22, particularly, in order to increase the exhaust gas temperature and to reduce the engine-out HC emissions. As mentioned above, in the TDC injection operating mode, fuel injection start timing ITS is before compression TDC, and fuel injection end timing ITE is after compression TDC. Ignition timing ADV is delayed with respect to fuel injection start timing ITS by a predetermined lag D of 10° CA to 25° CA. During ignition lag D, the fuel spray moves from fuel injection valve 15 to spark plug 10 to form an ignitable air-fuel mixture around spark plug 10. In the TDC injection operating mode, the engine performs stratified charge combustion. The fuel injection quantity is controlled so that the overall air-fuel ratio is at or near the stoichiometric air-fuel ratio.

Figure 5:
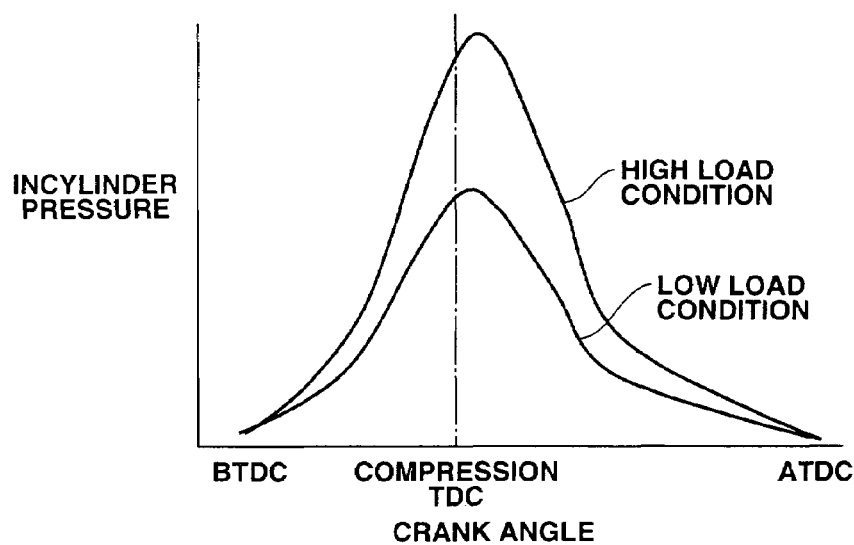
FIG. 5 illustrates how an incylinder pressure varies with respect to a crank angle in a direct-injection spark-ignition internal combustion engine.

FIG. 5 illustrates how an incylinder pressure varies with respect to a crank angle in a direct-injection spark-ignition internal combustion engine. As shown in FIG. 5, the incylinder pressure is high at or near compression TDC. In addition, the incylinder pressure increases with an increase in the engine load. In order to inject the fuel against high incylinder pressures at or near compression TDC under high load conditions, the combustion control apparatus performs a penetration control operation of adjusting engine operating parameters of the engine to promote spray penetration of the fuel in combustion chamber 5 in the TDC injection operating mode. In other words, the combustion control apparatus performs a penetration control operation of adjusting the engine operating parameters to compensate for a decrease in the fuel spray penetration which is caused by retarding the fuel injection timing.

In the first embodiment, the engine is operated in the normal operating mode during an engine temperature such as a coolant temperature being higher than 80° C., and is operated in the TDC injection operating mode during the engine temperature being lower than or equal to 80° C. In the TDC injection operating mode, the fuel-injection timing, which collectively refers to fuel injection start timing ITS and fuel injection end timing ITE, is controlled so that fuel injection end timing ITE is set to a desired crank angle which is determined in accordance with the engine speed. Fuel injection start timing ITS is determined in accordance with fuel injection end timing ITE and the fuel injection quantity. At same engine speeds, fuel injection start timing ITS advances with an increase in the engine load, that is, an increase in the fuel injection quantity.

Under a high load condition, the fuel injection starts at an earlier timing that the incylinder pressure is relatively low. After the fuel injection starts, a fuel spray travels at a high speed so that the pressure behind the fuel decreases. The following fuel spray travels without resistance due to the incylinder pressure, even when the incylinder pressure increases around compression TDC. Therefore, the fuel spray is stably formed, and thereby the incylinder combustion is stably performed, in the TDC injection operating mode in the first embodiment.

Figure 10A:
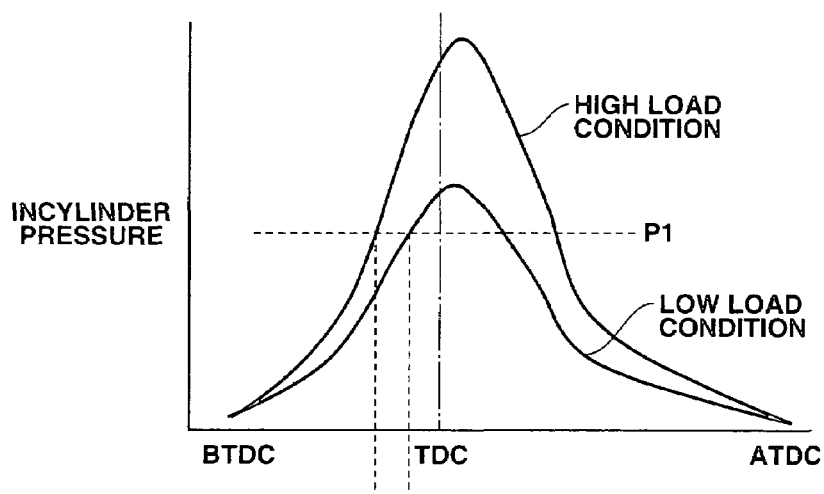
FIGS. 10A and 10B illustrate how fuel injection start timing ITS varies with a change in the engine load in accordance with a modification to the first embodiment.
Figure 10B:
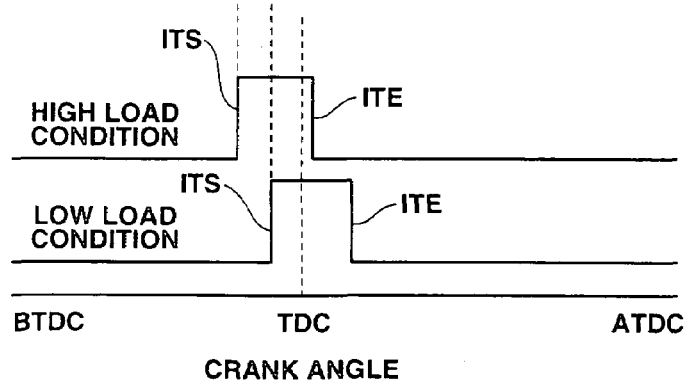

FIGS. 10A and 10B show a modification to the first embodiment. In this modification, fuel injection start timing ITS is determined prior to fuel injection end timing ITE. Fuel injection start timing ITS is adjusted in accordance with the engine load so that the incylinder pressure at fuel injection start timing ITS is held constant with respect to the engine load. Fuel injection end timing ITE is determined in accordance with fuel injection start timing ITS and the fuel injection quantity. Specifically, as shown in FIG. 10A, the incylinder pressure increases with an increase in the engine load, or with an increase in the quantity of intake air. As shown in FIG. 10B, under a low load condition, the incylinder pressure at fuel injection start timing ITS is equal to a pressure P1. Under a high load condition, fuel injection start timing ITS is adjusted so that the incylinder pressure at fuel injection start timing ITS is equal to the pressure P1. This may be implemented by using a control map for looking up a desired fuel injection start timing ITS with parameters of the engine load such as the intake-air quantity and the accelerator opening.

In this modification, the fuel pressure may be variably controlled. Specifically, the fuel pressure may be relatively high under high load conditions in which the fuel injection quantity is large, so as not to increase the fuel injection duration.

When the engine load is high and thereby the intake air quantity is large, the incylinder pressure on the compression stroke is relatively high. However, the combustion control apparatus adjusts fuel injection start timing ITS in accordance with the engine load so that the incylinder pressure at fuel injection start timing ITS is held constant with respect to the engine load. This adjustment serves to cancel effects based on a change in the engine load. Therefore, the combustion control apparatus is effective for stable formation of fuel spray around a spark plug and for stable combustion.

Figure 11:
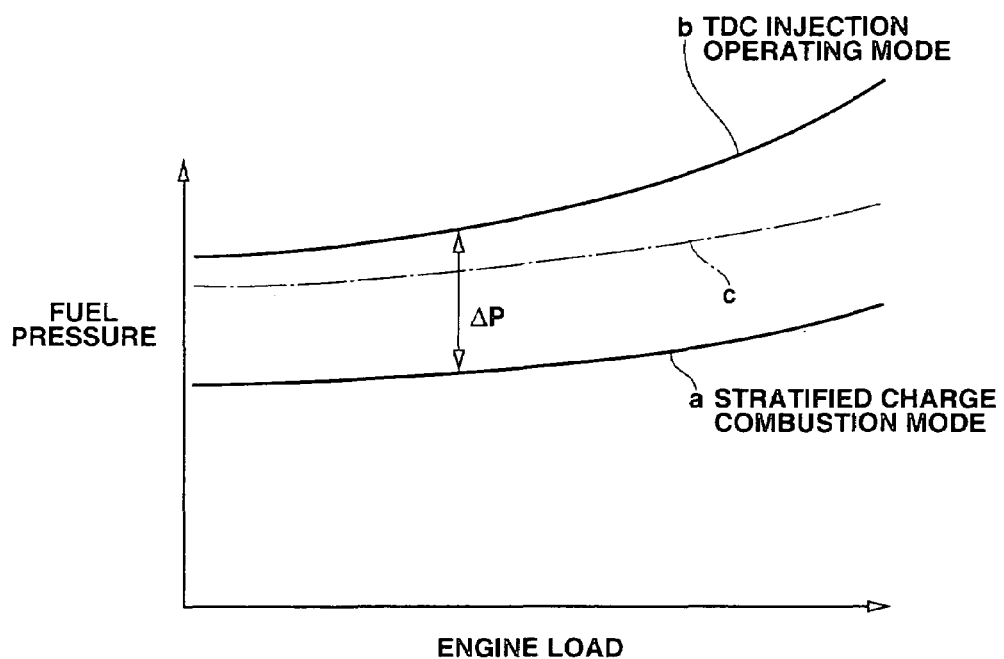
FIG. 11 illustrates how a fuel pressure of a fuel injector varies with respect to an engine load in a direct-injection spark-ignition internal combustion engine with a combustion control apparatus in accordance with a second embodiment of the present invention.
Figure 12:
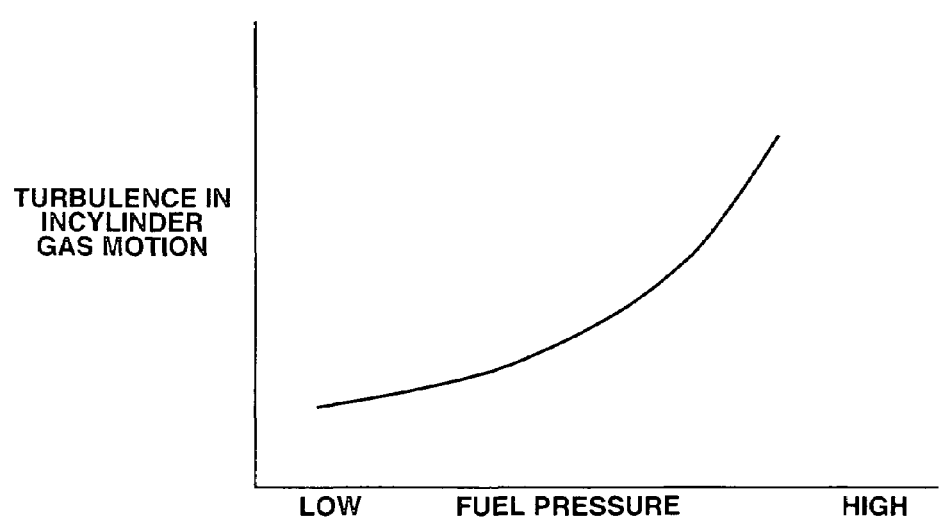
FIG. 12 illustrates how a turbulence in incylinder gas motion varies with respect to the fuel pressure in the engine in accordance with the second embodiment.

Referring now to FIGS. 11 and 12, there is shown an in-line four cylinder direct-injection spark-ignition internal combustion engine with- a combustion control apparatus in accordance with a second embodiment of the present invention. The combustion control apparatus of the second embodiment is configured basically as in the first embodiment shown in FIGS. 6 through 8, except a routine to be executed by control unit 35. Pressure regulator 32 is configured to regulate the fuel pressure for fuel injection valve 15 in a relatively wide range, in accordance with a command signal from control unit 35.

In the second embodiment, in the TDC injection operating mode, the fuel-injection timing is controlled so that fuel injection start timing ITS is set to a desired crank angle which is determined in accordance with the engine speed. Fuel injection end timing ITE is determined in accordance with fuel injection start timing ITS and the fuel injection quantity. Fuel injection start timing ITS and fuel injection end timing ITE may be controlled in accordance with the fuel injection quantity so that the midpoint in fuel injection duration T is identical to compression TDC.

FIG. 12 illustrates how the turbulence in the incylinder gas motion varies with respect to the fuel pressure. As shown in FIG. 12, the turbulence in the incylinder gas motion increases with an increase in the fuel pressure.

FIG. 11 illustrates how the fuel pressure varies with respect to the engine load. In the TDC injection operating mode, control unit 35 is configured to control the fuel pressure in accordance with the engine load so that the fuel pressure varies along the line indicated by b in FIG. 11. Specifically, the fuel pressure increases with an increase in the engine load. In addition, the pressure difference ΔP between the TDC injection operating mode and the stratified charge combustion mode increases with an increase in the engine load. The line indicated by c is a reference line which is produced by adding a fixed adjustment to the line a.

As mentioned above, the incylinder pressure increases with an increase in the engine load, or with an increase in the quantity of intake air, as shown in FIG. 10A. In this embodiment, the combustion control apparatus controls the fuel pressure to increase with an increase in the engine load as shown by the line b in FIG. 11. Specifically, the combustion control apparatus adjusts the fuel pressure so that the difference in the fuel pressure between the TDC injection operating mode and the normal operating mode increases with an increase in the engine load. Accordingly, the fuel spray penetration in the combustion chamber is enhanced against the incylinder pressure, so that a suitable air-fuel mixture is formed around spark plug 10. In addition, the energy of the fuel spray generates a high degree of turbulence in the incylinder gas motion, to activate the incylinder combustion.

In a third embodiment of the present invention, a combustion control apparatus is configured basically as in the second embodiment, except a routine to be executed by control unit 35. In the third embodiment, in the TDC injection operating mode, control unit 35 controls the fuel pressure to increase with an increase in the engine speed. Specifically, the fuel pressure is controlled to be proportional to the square of the engine speed. In order to stabilize the incylinder combustion under high speed conditions, the combustion speed is increased by increasing the fuel pressure with an increase in the engine speed so that the turbulence in the incylinder gas motion is enhanced to increase the combustion speed, in this embodiment. Therefore, the combustion control apparatus is effective for stabilizing combustion under high speed conditions in which the duration of an engine cycle is short, to cancel the adverse effects based on the increase in the engine speed.

The speed of fuel spray is proportional to the square root of the fuel pressure. In this embodiment, the fuel pressure is controlled to be proportional to the square of the engine speed. Therefore, the flow field is consistent with the engine speed.

Figure 13:
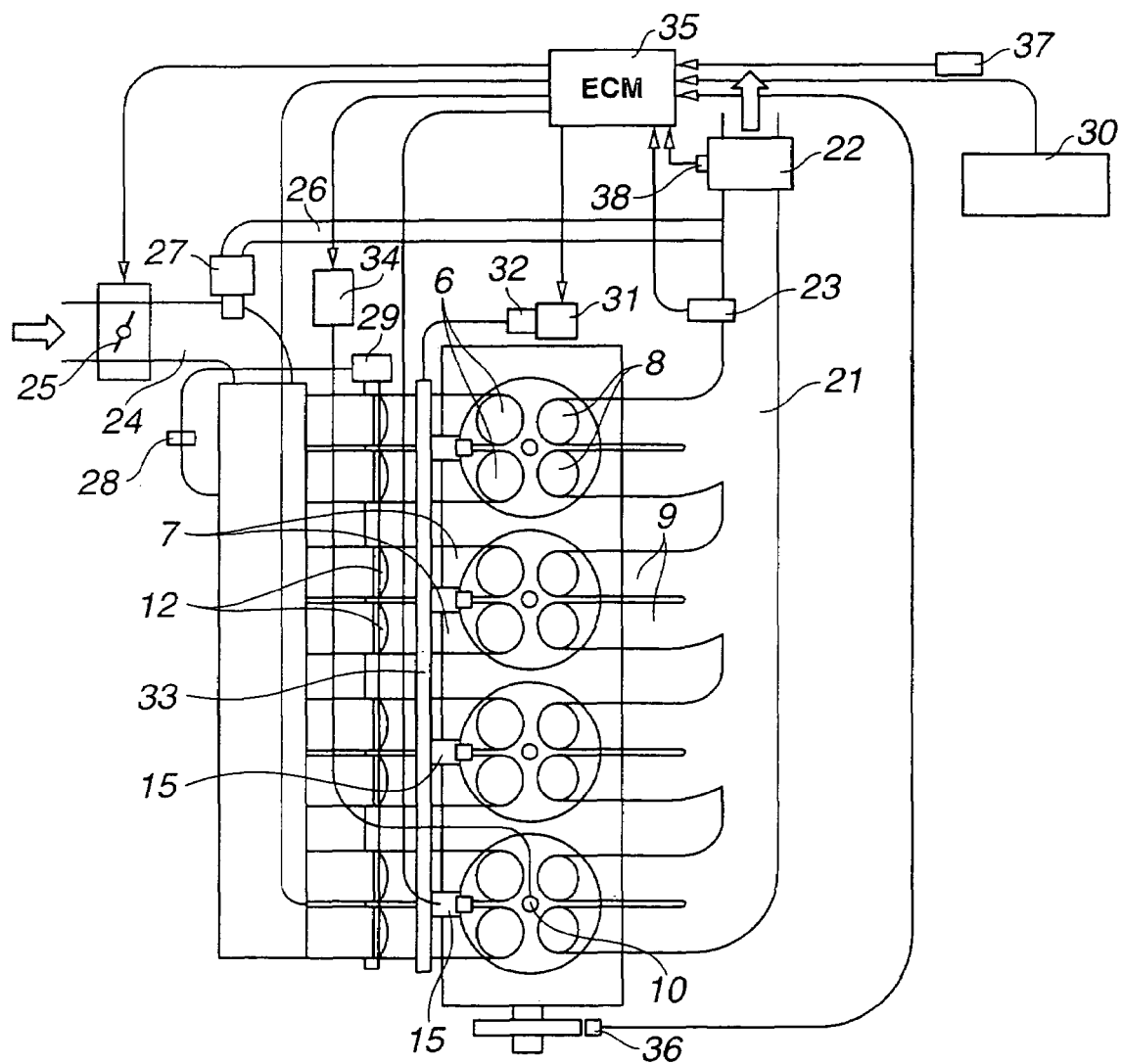
FIG. 13 is a schematic diagram depicting a direct-injection spark-ignition internal combustion engine with a combustion control apparatus in accordance with a fourth embodiment of the present invention.

Referring now to FIGS. 13 through 16, there is shown an in-line four cylinder direct-injection spark-ignition internal combustion engine with a combustion control apparatus in accordance with a fourth embodiment of the present invention. The combustion control apparatus of the fourth embodiment is configured basically as in the first embodiment shown in FIGS. 6 through 8, except an additional sensor and a routine to be executed by control unit 35. As shown in FIG. 13, a catalyst temperature sensor 38 is provided to measure a temperature condition of catalytic converter 22. Catalyst temperature sensor 38 is disposed at a longitudinal midpoint of a monolith ceramic catalyst carrier of catalytic converter 22. Control unit 35 is configured to hold the fuel pressure constant.

In this embodiment, the fuel-injection timing is controlled so that fuel injection start timing ITS is set to a desired crank angle. Fuel injection end timing ITE is determined in accordance with fuel injection start timing ITS and the fuel injection quantity. Fuel injection start timing ITS and fuel injection end timing ITE may be controlled in accordance with the fuel injection quantity so that the midpoint in fuel injection duration T is identical to compression TDC.

In the TDC injection operating mode, fuel is injected around TDC in which piston 3 is at or near its upper end. That is, the fuel is injected into the combustion chamber at the moment its volume is small. This tends to increase flows of the fuel spray on the walls of the combustion chamber, namely on the side wall of the cylinder and the piston crown. Accordingly, during the engine being in clod conditions in which the incylinder temperature or temperatures of the walls of the combustion chamber are low, the increase of the fuel flow on the walls tends to increase unburned HC. In addition, the exhaust gas temperature is low in cold start, so that it is possible that the exhaust system does not perform a desired function of oxidation of HC and thereby allows emission of the unburned HC.

Figure 16:
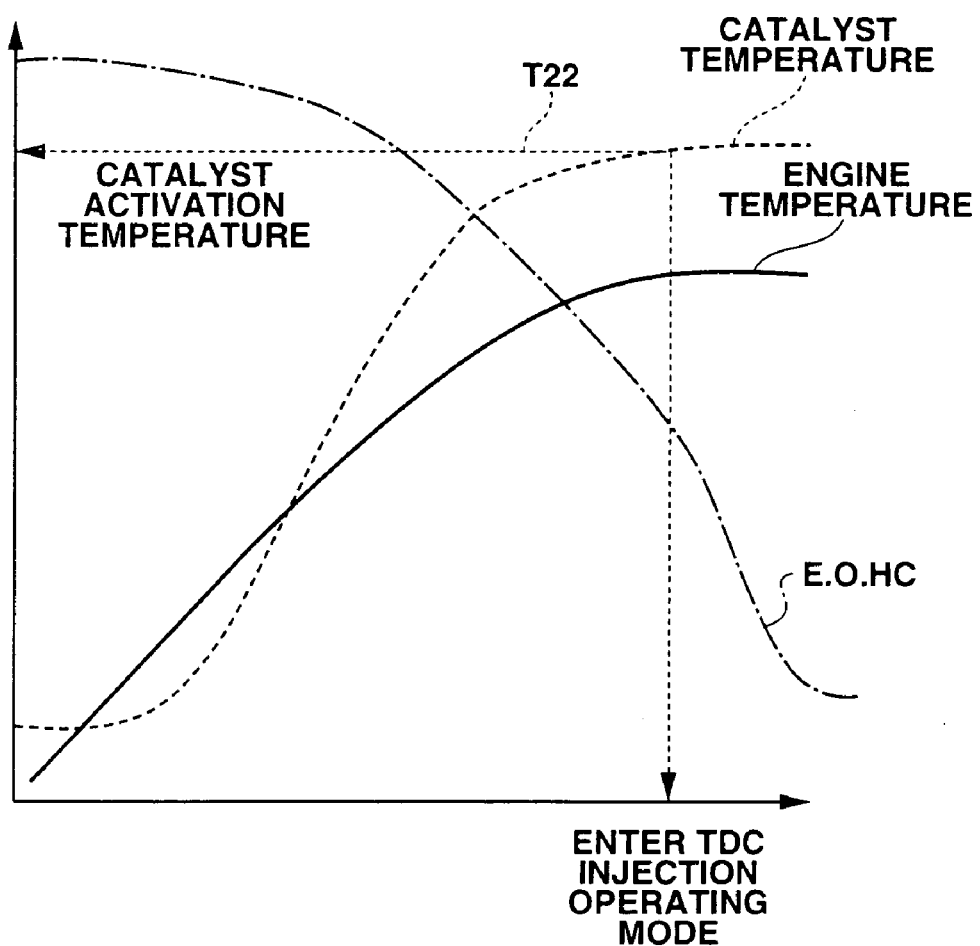
FIG. 16 illustrates how the engine temperature, the catalyst temperature, and the quantity of engine-out HC emissions vary with time in a reference case in which a TDC injection operating mode is employed from cold start in the engine of FIG. 13.

FIG. 16 illustrates how the generated quantity of HC after cold start, called engine-out HC emissions, the catalyst temperature, and the engine temperature (coolant temperature or oil temperature) vary with respect to time. FIG. 16 shows a case the TDC injection operating mode is employed just after engine start. As shown in FIG. 16, the engine temperature gradually increases with time. The catalyst temperature also gradually increases. The quantity of engine-out HC emissions is large due to the fuel flow on the walls just after cold start, and decreases with an increase in the engine temperature.

Figure 14:
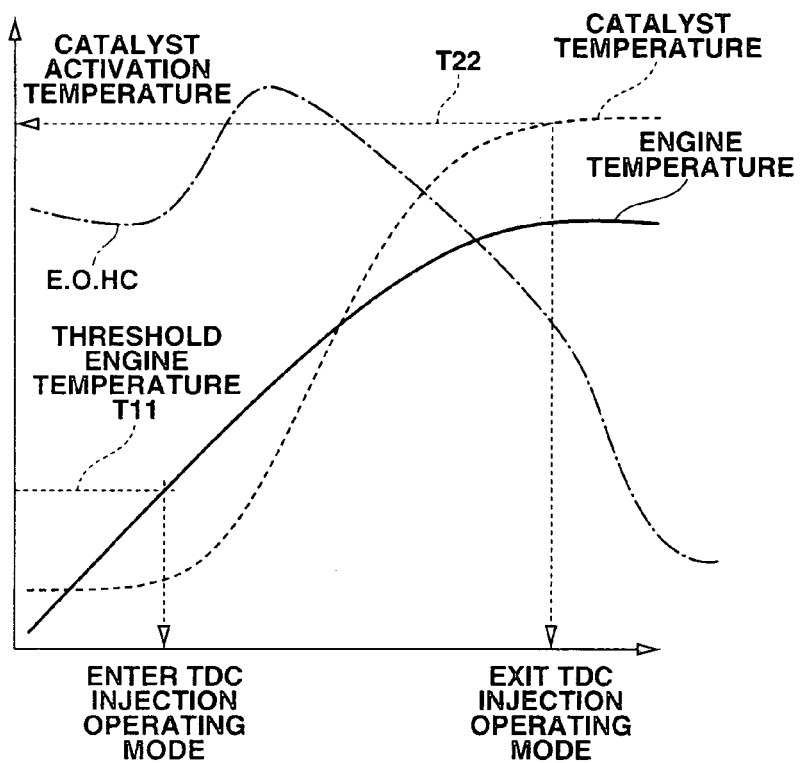
FIG. 14 illustrates how an engine temperature, a catalyst temperature, and the quantity of engine-out HC emissions vary with time in accordance with the fourth embodiment.

In the fourth embodiment, control unit 35 inhibits the TDC injection operating mode during the engine being in a predetermined low temperature condition. Specifically, control unit 35 inhibits the TDC injection operating mode after cold start until the engine temperature exceeds a predetermined first threshold temperature T11, as shown in FIG. 14. During this initial duration, the engine is operated in the normal cold condition operating mode. The normal cold condition operating mode serves to increase the exhaust gas temperature without increasing the wall flow of the fuel spray. In case catalytic converter 22 is in a completely cold condition where the catalyst temperature is at or near the outside atmosphere temperature, the normal cold condition operating mode also serves to gradually heat catalytic converter 22 by the heat in the exhaust gas. In case the normal cold condition operating mode is employed just after cold start, the wall flow of the fuel spray is in a lower level, and thereby the quantity of engine-out HC emissions is smaller than the TDC injection operating mode.

When the engine temperature increases to be first threshold temperature T11, control unit 35 enters the TDC injection operating mode. In the TDC injection operating mode, the exhaust gas temperature rapidly increases to heat catalytic converter 22. When catalytic converter 22 is activated, the temperature of catalytic converter 22 further rapidly increases. As shown in FIG. 14, the quantity of engine-out HC emissions temporarily and slightly increases just after the entrance into the TDC injection operating mode, and rapidly decreases with an increase in the engine temperature.

Figure 15:
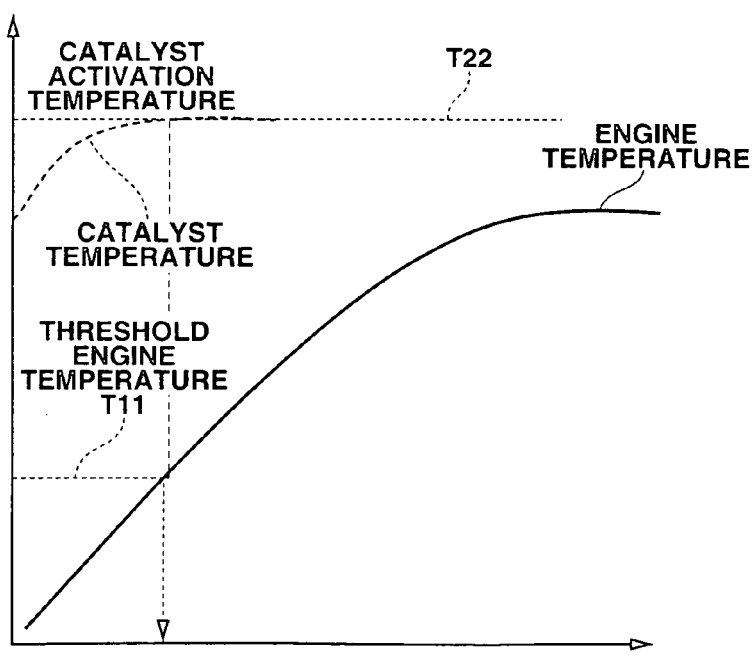
FIG. 15 illustrates how the engine temperature, the catalyst temperature, and the quantity of engine-out HC emissions vary with time in accordance with the fourth embodiment in case the catalyst temperature exceeds a predetermined second threshold temperature T22 before the engine temperature exceeds a predetermined first threshold temperature T11.

When the temperature of catalytic converter 22 which is measured by catalyst temperature sensor 38 exceeds a predetermined second threshold temperature T22, control unit 35 terminates the TDC injection operating mode and enters the normal warmed-up condition operating mode which includes the homogeneous charge combustion mode and the stratified charge combustion mode. Second threshold temperature T22 is a catalyst activation temperature of catalytic converter 22. As shown in FIG. 15, if the temperature of catalytic converter 22 exceeds second threshold temperature T22 before the engine temperature exceeds first threshold temperature T11, the normal cold condition operating mode is not switched to the TDC injection operating mode but directly to the normal warmed-up condition operating mode.

The combustion control apparatus in accordance with the above-mentioned fourth embodiment wherein the TDC injection operating mode is employed after the engine temperature exceeds first threshold temperature T11, is effective for preventing the quantity of engine-out HC emissions from transiently and excessively increasing due to the increase in the wall flow of the fuel spray in the cold start. The TDC injection operating mode serves to rapidly increase the exhaust gas temperature to increase the temperature of catalytic converter 22, so that the duration required for catalyst activation is substantially same as in a case the TDC injection operating mode is used just after cold start.

As mentioned above, the exhaust gas temperature is very high in the TDC injection operating mode. Accordingly, in case the TDC injection operating mode is employed just after cold start in which catalytic converter 22 is in a completely cold condition, it is possible that catalytic converter 22 is rapidly heated, and that thermal strain is generated in catalytic converter 22. The combustion control apparatus in accordance with this embodiment, wherein the engine is operated in the TDC injection operating mode after catalytic converter 22 is heated above a predetermined level, is effective for reducing the duration required for full activation of the catalyst and for avoiding large thermal strain or thermal degradation in catalytic converter 22.

Figure 17:
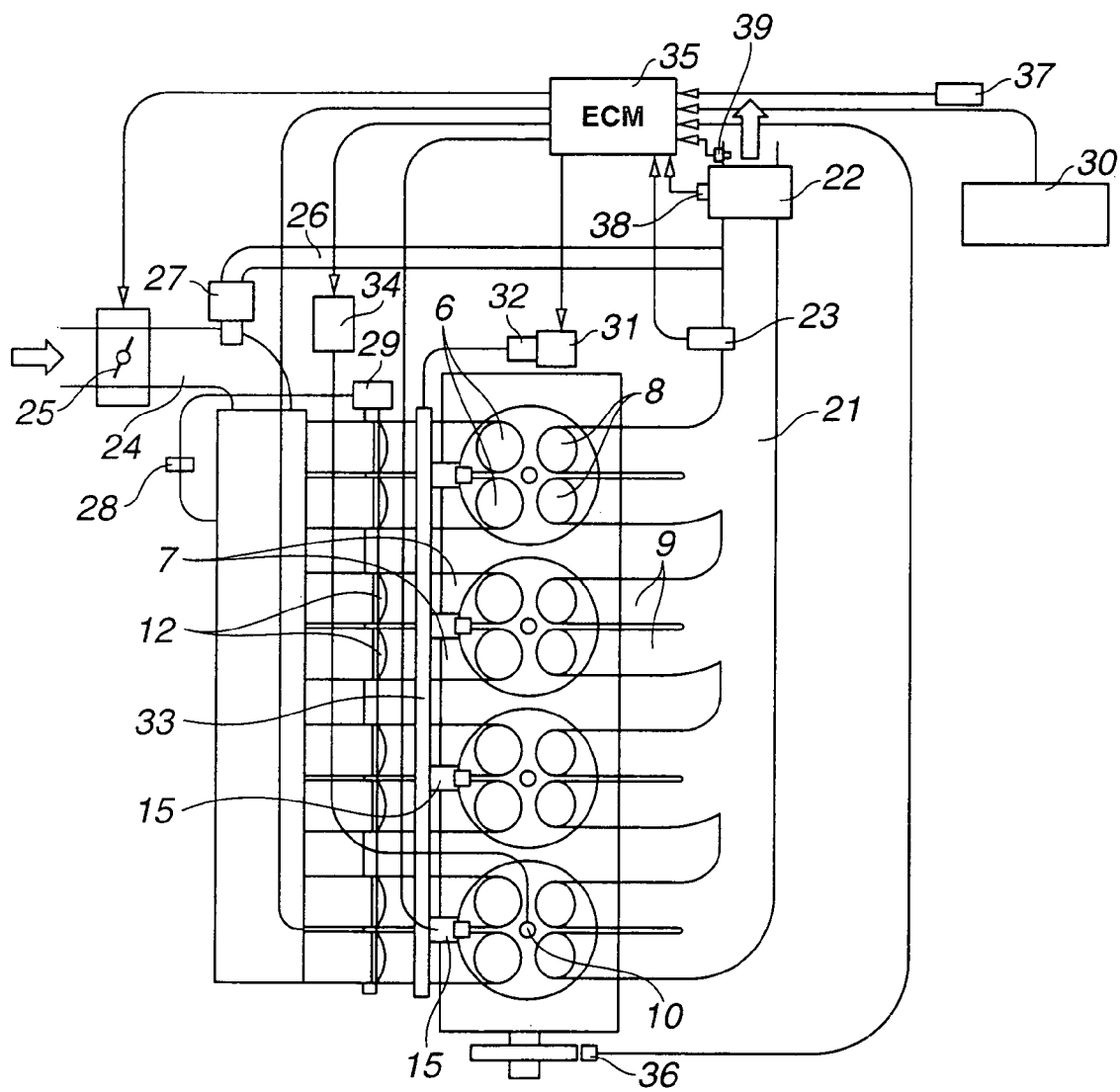
FIG. 17 is a schematic diagram depicting a direct-injection spark-ignition internal combustion engine with a combustion control apparatus in accordance with a fifth embodiment of the present invention.

Referring now to FIGS. 17 through 23, there is shown an in-line four cylinder direct-injection spark-ignition internal combustion engine with a combustion control apparatus in accordance with a fifth embodiment of the present invention. The combustion control apparatus of the fifth embodiment is configured basically as in the first embodiment shown in FIGS. 6 through 8, except additional sensors and a routine to be executed by control unit 35. As shown in FIG. 17, a catalyst temperature sensor 38 and a catalytic converter outlet temperature sensor 39 are provided to measure a temperature condition of catalytic converter 22. Catalyst temperature sensor 38 is disposed at a longitudinal midpoint of a monolith ceramic catalyst carrier of catalytic converter 22. Catalytic converter outlet temperature sensor 39 is disposed at the outlet of catalytic converter 22. Control unit 35 is configured to hold the fuel pressure constant.

In this embodiment, the fuel-injection timing is controlled so that fuel injection start timing ITS is set to a desired crank angle. Fuel injection end timing ITE is determined in accordance with fuel injection start timing ITS and the fuel injection quantity. Fuel injection start timing ITS and fuel injection end timing ITE may be controlled in accordance with the fuel injection quantity so that the midpoint in fuel injection duration T is identical to compression TDC.

In case the TDC injection operating mode is employed when the engine load increases due to starting a vehicle or an increase in auxiliary load, it is possible that the temperature of catalytic converter 22 excessively increases to generate thermal damage or degradation in catalytic converter 22. Furthermore, even if the TDC injection operating mode is canceled when the catalyst temperature reaches a catalyst activation temperature, it is possible that heat in the exhaust system in the upstream of catalytic converter 22 and heat of reaction in the catalyst serve to increase the internal temperature in catalytic converter 22 so that the internal temperature overshoots to be a temperature for degrading the catalyst. Moreover, in the TDC injection operating mode, the exhaust gas temperature is very high, so that catalytic converter 22 is rapidly heated. In case the TDC injection operating mode is employed from engine start when catalytic converter 22 is in a completely-cold condition, it is possible that the gradient of temperature in catalytic converter 22 is large. Specifically it is possible that an upstream portion of the monolith ceramic catalyst carrier of catalytic converter 22 is locally and rapidly heated, to increase thermal strain in catalytic converter 22. In this embodiment, the engine is operated in a plurality of combustion modes, which are switched in accordance with the temperature condition of catalytic converter 22. Specifically, the TDC injection operating mode is inhibited during catalytic converter 22 being in a predetermined low temperature condition, and during the engine load being high.

Figure 18:
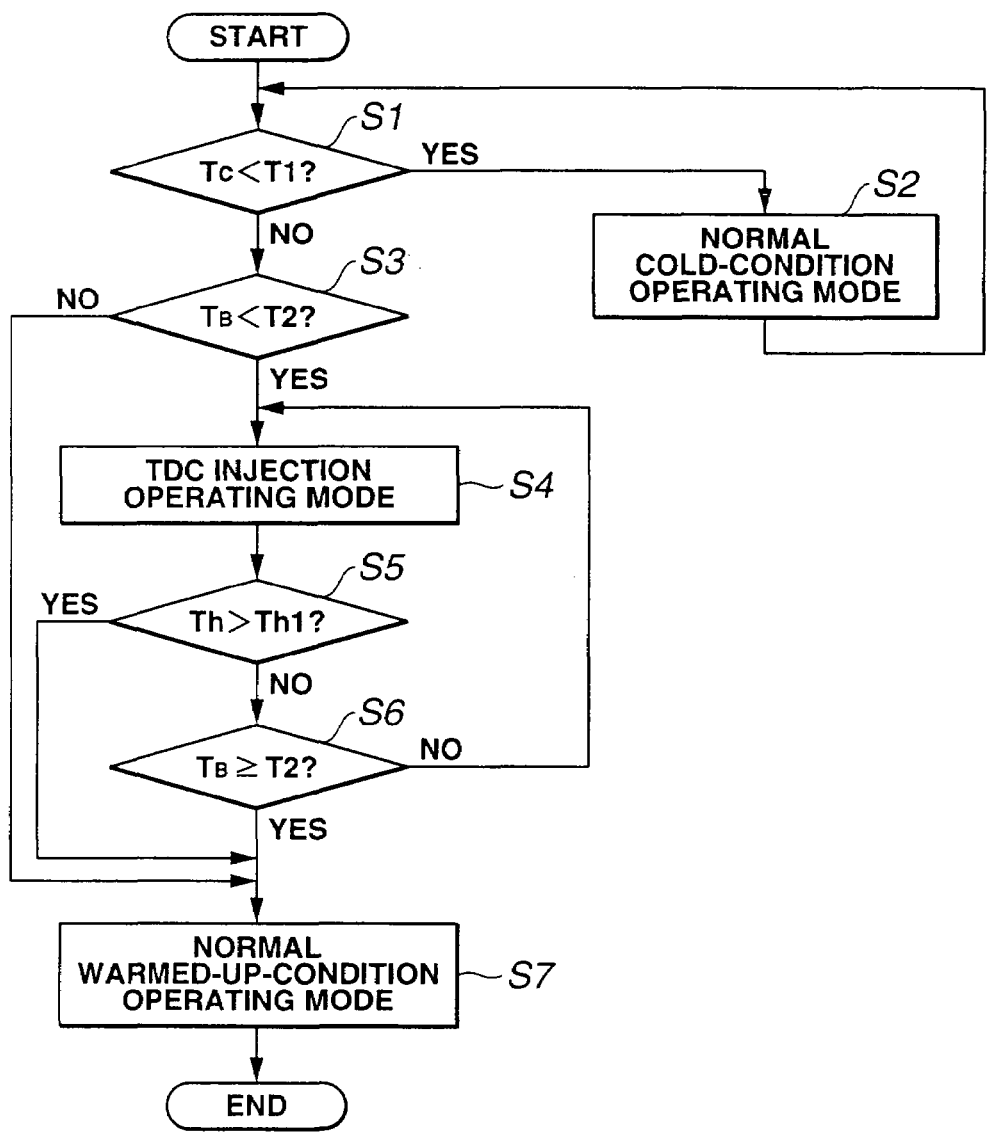
FIG. 18 is a flow chart depicting a routine to be executed by the combustion control apparatus in accordance with the fifth embodiment.

FIG. 18 is a flow chart showing a routine to be executed by control unit 35. The routine of FIG. 18 is repeatedly executed by control unit 35 at intervals of a predetermined processing time interval such as 10 ms, called by timer interrupt. Although steps of communications within control unit 35 are not shown in FIG. 18, processed data is stored in the memories, updating the previous data, and reference information is read from the memories, as occasion arises. As shown in FIG. 18, first, at step S1, control unit 35 compares a predetermined first reference temperature T1 with a catalytic converter outlet temperature $T_C$ measured by catalytic converter outlet temperature sensor 39. Specifically, control unit 35 determines whether or not catalytic converter outlet temperature $T_C$ is lower than first reference temperature T1. First reference temperature T1 is substantially equal to a lowest catalyst activation temperature of the catalyst, such as a temperature from 150° C. to 200° C. When the answer to step S1 is affirmative (YES), the routine proceeds to step S2. At step S2, control unit 35 operates the engine in a normal cold condition operating mode. In the normal cold condition operating mode, the engine is controlled to moderately increase the exhaust gas temperature. The temperature increase is not so rapid as in the TDC injection operating mode. Specifically, in the normal cold condition operating mode, the fuel injection is performed during the intake stroke, and the ignition is performed a little before the MBT point before compression TDC. Fuel may be injected on the compression stroke in addition to the intake stroke fuel injection. Thus, when catalytic converter 22 is in a completely cold condition in engine start, control unit 35 operates the engine in the normal cold condition operating mode so that the temperature of catalytic converter 22 gradually increases.

On the other hand, when the answer to step S1 is negative (NO), the routine proceeds to step S3. At step S3, control unit 35 compares a predetermined second reference temperature T2 with a catalyst temperature $T_B$ measured by catalyst temperature sensor 38. Specifically, control unit 35 determines whether or not catalyst temperature $T_B$ is lower than second reference temperature T2. Second reference temperature T2 is substantially equal to a catalyst full activation temperature for full activity of the catalyst, particularly a little lower than the catalyst full activation temperature, such as a temperature from 250° C. to 300° C. When the answer to step S3 is YES, the routine proceeds to step S4. On the other hand, when the answer to step S3 is NO; the routine proceeds to step S7; At step S4, control unit 35 operates the engine in the TDC injection operating mode. In cold start, at the moment catalytic converter outlet temperature $T_C$ exceeds first reference temperature T1, catalyst temperature $T_B$ is usually lower than second reference temperature T2. Accordingly, during cold start, the engine operating mode is shifted from the normal cold condition operating mode to the TDC injection operating mode. At step S6, control unit 35 determines whether or not catalyst temperature $T_B$ is higher than or equal to second reference temperature T2. When the answer to step S6 is YES, the routine proceeds to step S7. On the other hand, when the answer to step S6 is NO, the routine proceeds to step S4. Thus, the TDC injection operating mode is active until catalyst temperature $T_B$ exceeds second reference temperature T2. At step S7, control unit 35 operates the engine in a normal warmed-up condition operating mode. Specifically, in the normal warmed-up condition operating mode, the engine is operated in the homogeneous charge combustion mode, or in the normal stratified charge combustion mode.

Between steps S4 and S6, step S5 is executed. At step S5, control unit 35 determines whether or not a throttle opening Th of throttle valve 25 is higher than a predetermined threshold value Th1. When the answer to step S5 is YES, the routine proceeds to step S7. On the other hand, when the answer to step S5 is NO, the routine proceeds to step S6. Thus, control unit 35 exits the TDC injection operating mode, even when catalyst temperature $T_B$ does not exceed second reference temperature T2, if throttle opening Th exceeds-threshold value Th1. In this embodiment, the TDC injection operating mode is shifted to the normal warmed-up condition operating mode. Alternatively, it is optional to employ the normal cold condition operating mode until catalyst temperature $T_B$ exceeds second reference temperature T2.

As shown above, the combustion control apparatus of this embodiment wherein the TDC injection operating mode is inhibited until catalytic converter outlet temperature $T_C$ exceeds first reference temperature T1, is effective for reducing a duration of full activation of the catalyst and avoiding thermal degradation of catalytic converter 22.

Figure 19:
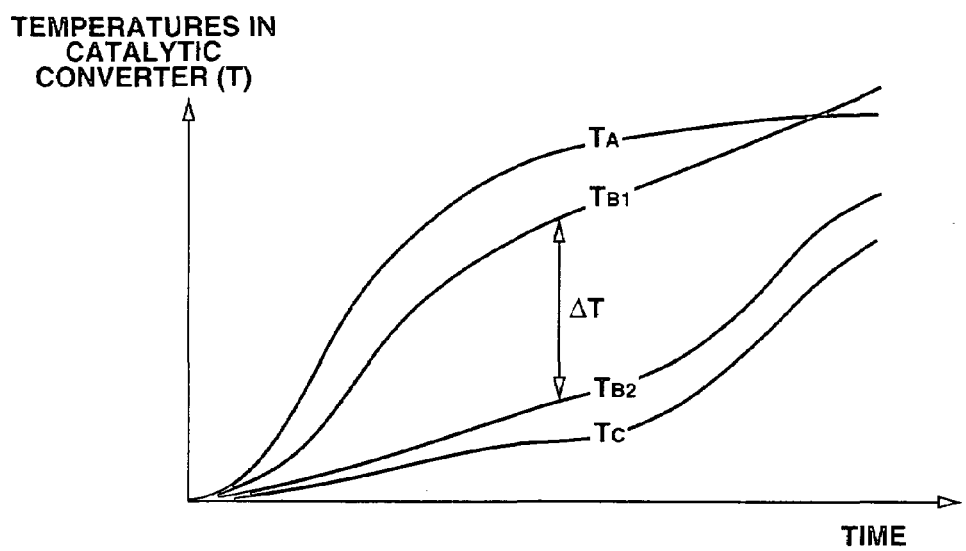
FIG. 19 illustrates how temperatures in a catalytic converter of an engine varies with respect to time in a reference case in which an exhaust gas temperature is high in cold start.
Figure 20:
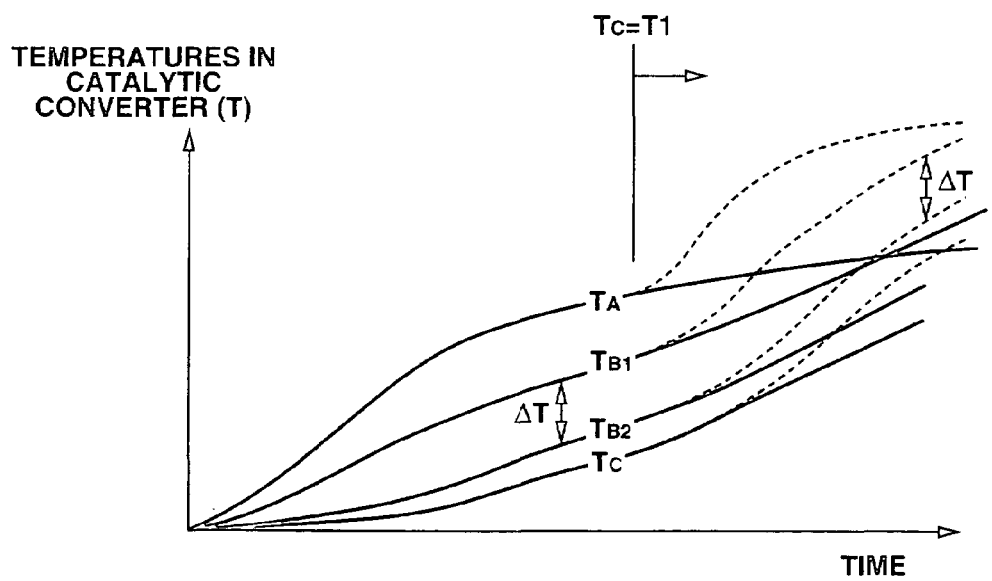
FIG. 20 illustrates how temperatures in a catalytic converter of an engine varies with respect to time in case an exhaust gas temperature is low in cold start.
Figure 21:
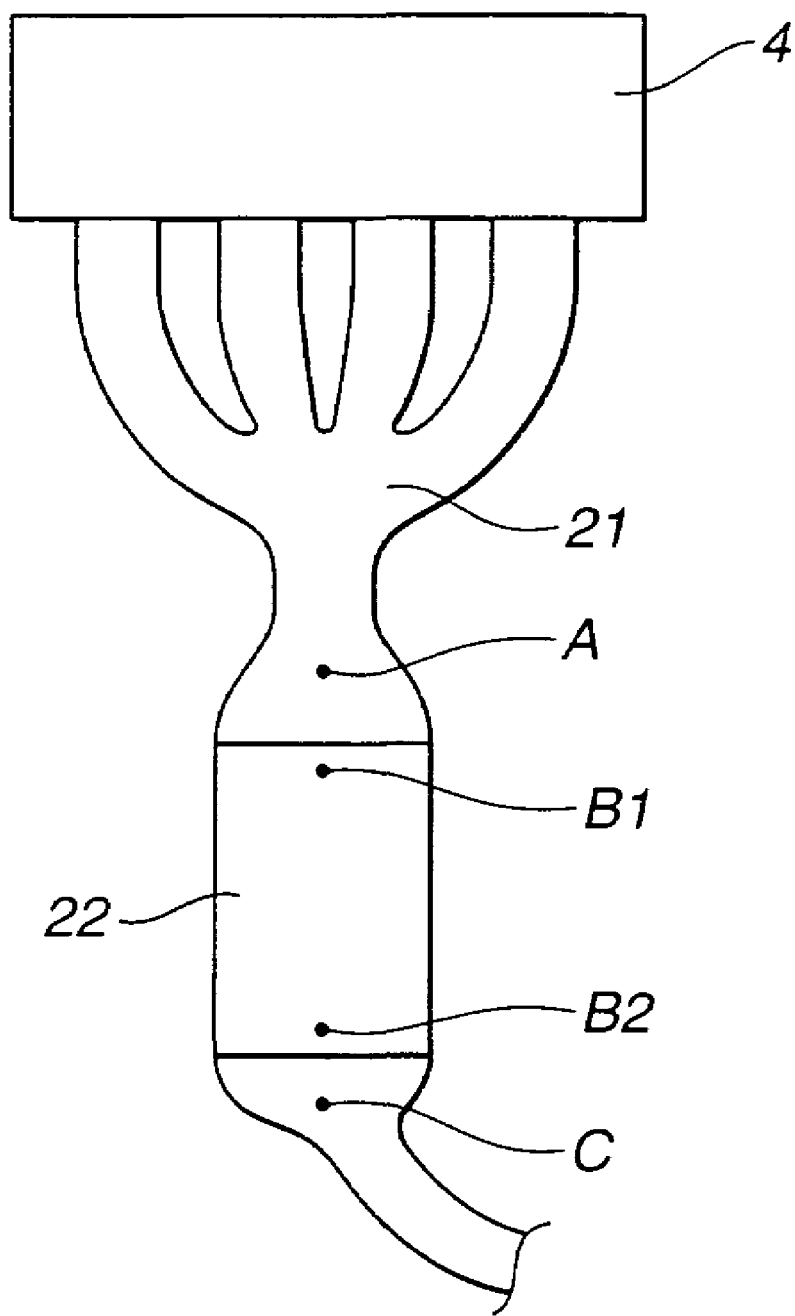
FIG. 21 is a top view of an exhaust system of the engine of FIG. 17, illustrating measurement points for the temperatures in FIGS. 19 and 20.

FIGS. 19 and 20 illustrate how temperatures in catalytic converter 22 vary with respect to time in cases the engine is started from completely cold conditions. FIG. 19 shows a case the exhaust gas temperature is very high. FIG. 20 shows a case the exhaust gas temperature is relatively low. FIG. 21 is a schematic diagram depicting the exhaust system including a plurality of target portions of temperature measurement. The sensors measure a temperature $T_A$ at an inlet point A of catalytic converter 22, a temperature $T_{B1}$ at an upstream point B1 of the catalyst carrier, a temperature $T_{B2}$ at a downstream point B2 of the catalyst carrier, and temperature $T_C$ at an outlet point of catalytic converter 22.

As shown in FIG. 19, in case the engine is operated in the TDC injection operating mode to hold the exhaust gas temperature to be vary high from the engine start, temperature $T_{B1}$ and temperature $T_A$ increase rapidly so that the temperature difference $\Delta T$ between $T_{B1}$ and $T_{B2}$ is very large. This produces thermal distortion in catalytic converter 22.

In contrast, in case the exhaust gas temperature is low, the temperature difference $\Delta T$ is small, as shown in FIG. 20. When the TDC injection operating mode is started at a time point temperature $T_C$ exceeds first reference temperature T1, the temperatures vary as shown by broken lines in FIG. 20. After the start of the TDC injection operating mode, the temperatures increase rapidly so that the time required to completely activate the catalyst is comparable with the required time of the case of FIG. 19. At the time point of the mode switch, there is released heat of reaction in the catalyst. This keeps the temperature difference $\Delta T$ relatively small.

When throttle opening Th increases to increase the fuel injection quantity in the TDC injection operating mode, it is possible that the exhaust gas temperature or temperature $T_A$ is excessively high to further increase temperature $T_{B1}$ and thereby to increase the temperature difference $\Delta T$ or the thermal strain in catalytic converter 22. After temperature $T_B$ reaches second reference temperature T2 to terminate the TDC injection operating mode, it is possible that heat in the exhaust system in the upstream of catalytic converter 22 and heat of reaction in the catalyst serve to increase the internal temperature in catalytic converter 22 so that the internal temperature overshoots to be a temperature for degrading the catalyst. In contrast, in this embodiment, the control apparatus wherein the TDC injection operating mode discontinues when throttle opening Th exceeds threshold value Th1, is effective for reducing the temperature overshoot and the thermal strain.

When throttle opening Th decreases again to be lower than threshold value Th1 after the TDC injection operating mode is inhibited because of throttle opening Th, the TDC injection operating mode is restarted if catalyst temperature $T_B$ is lower than second reference temperature T2.

Figure 22:
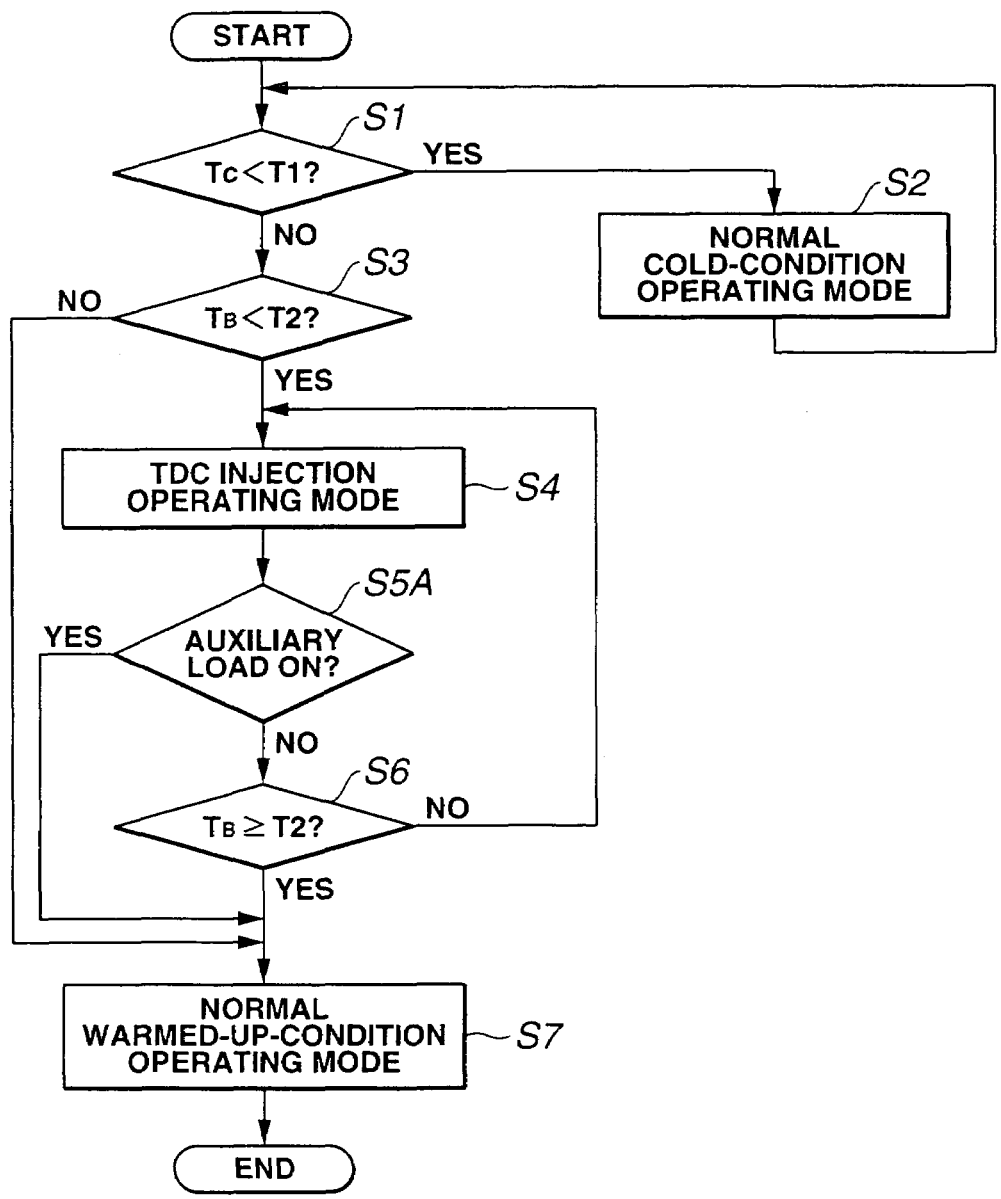
FIG. 22 is a flow chart depicting a routine to be executed by a combustion control apparatus in accordance with a modification to the fifth embodiment.
Figure 23:
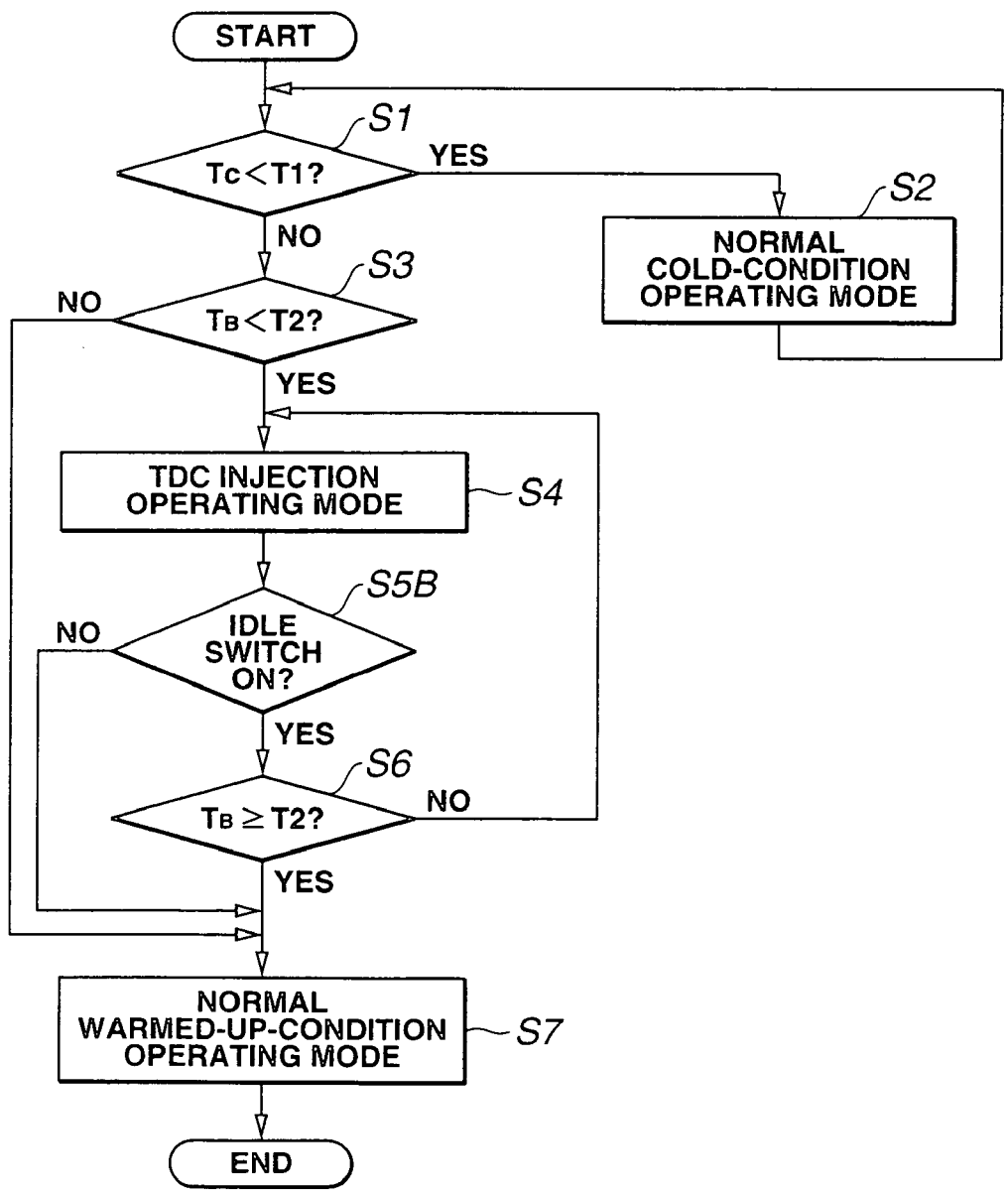
FIG. 23 is a flow chart depicting a routine to be executed by a combustion control apparatus in accordance with a modification to the fifth embodiment.

FIGS. 22 and 23 are flow charts depicting modifications to the routine of FIG. 18. Step S5 in the routine of FIG. 18 is replaced with step S5A and S5B to provide the routine of FIGS. 22 and 23, respectively. As shown in FIG. 22, at step S5A, control unit 35 determines whether or not an auxiliary load is ON. The auxiliary load is a load of auxiliary equipment such as a compressor for air-conditioner. The auxiliary load may be the sum of auxiliary devices. When the answer to step S5A is YES, the routine proceeds to step S7. On the other hand, when the answer to step S5A is NO, the routine proceeds to step S6. Thus, control unit 35 exits the TDC injection operating mode, even when catalyst temperature $T_B$ does not exceed second reference temperature T2, if the auxiliary load is ON.

As shown in FIG. 23, at step S5B, control unit 35 determines whether or not an idle switch is ON. When the answer to step S5B is YES, the routine proceeds to step S7. On the other hand, when the answer to step S5B is NO, the routine proceeds to step S6. Thus, control unit 35 exits the TDC injection operating mode, even When catalyst temperature $T_B$ does not exceed second reference temperature T2, if the idle switch is ON. The ON signal of the idle switch indicates that the depression of the accelerator pedal or throttle opening Th of throttle valve 25 is zero. The idle switch signal may be produced in a non-physical process. For example, the idle switch signal may be generated by processing the sensing data from accelerator opening sensor 30. When the vehicle starts from a standstill so that the idle state is cancelled, the TDC injection operating mode is cancelled or inhibited.

Figure 24:
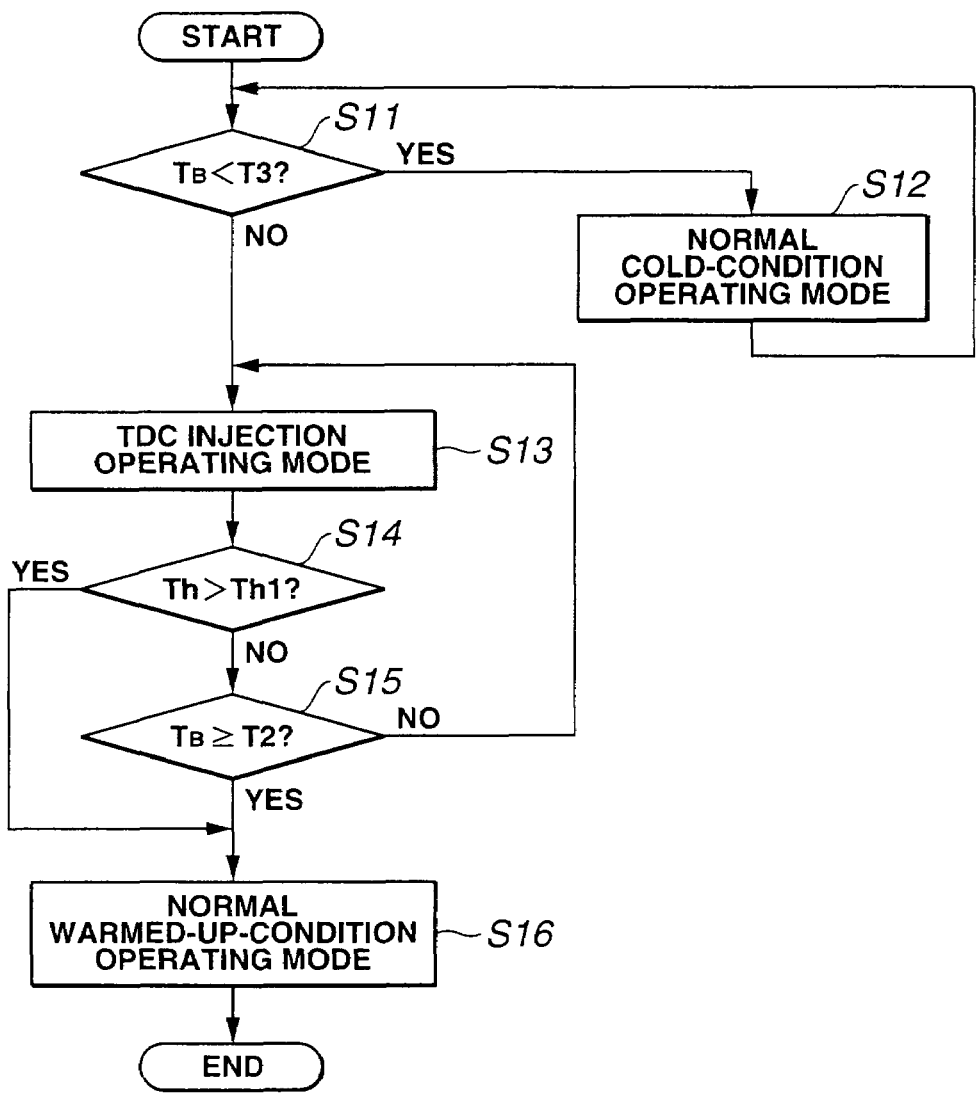
FIG. 24 is a flow chart depicting a routine to be executed by a combustion control apparatus in accordance with a modification to the fifth embodiment.

FIG. 24 is a flow chart depicting a further modification to the routine of FIG. 18. As shown in FIG. 24, first, at step S11, control unit 35 compares a predetermined third reference temperature T3 with catalyst temperature $T_B$ measured by catalyst temperature sensor 38. Specifically, control unit 35 determines whether or not catalyst temperature $T_B$ is lower than third reference temperature T3. Third reference temperature T3 is substantially equal to the lowest catalyst activation temperature, such as a temperature from 150° C. to 200° C. When the answer to step S11 is YES, the routine proceeds to step S12. At step S12, control unit 35 operates the engine in the normal cold condition operating mode.

On the other hand, when the answer to step S11 is NO, the routine proceeds to step S13. At step S13, control unit 35 operates the engine in the TDC injection operating mode. At step S15, control unit 35 determines whether or not catalyst temperature $T_B$ is higher than or equal to second reference temperature T2. When the answer to step S15 is YES, the routine proceeds to step S16. On the other hand, when the answer to step S15 is NO, the routine proceeds to step S13. Thus, the TDC injection operating mode is active until catalyst temperature $T_B$ exceeds second reference temperature T2. At step S16, control unit 35 operates the engine in the normal warmed-up condition operating mode, that is, in the homogeneous charge combustion mode, or in the normal stratified charge combustion mode. Between steps S13 and S15, step S14 is executed. At step S14, control unit 35 determines whether or not throttle opening Th of throttle valve 25 is higher than threshold value Th1. When the answer to step S14 is YES, the routine proceeds to step S16. On the other hand, when the answer to step S14 is NO, the routine proceeds to step S15. Thus, control unit 35 exits the TDC injection operating mode, even when catalyst temperature $T_B$ does not exceed second reference temperature T2, if throttle opening Th exceeds threshold value Th1.

As shown above, the combustion control apparatus of this modification of the fifth embodiment wherein the TDC injection operating mode is inhibited until catalyst temperature $T_B$ exceeds third reference temperature T3, is effective for reducing a duration of full activation of the catalyst and avoiding thermal damage or degradation of catalytic converter 22. In this modification, catalytic converter outlet temperature sensor 39 is not essential.

Step S14 in the routine of FIG. 24 may be replaced with step S5A concerning the auxiliary load, or step S5B concerning the idle switch signal, as the modifications of FIGS. 22 and 23.

Referring now to FIGS. 25 through 30, there is shown an in-line four cylinder direct-injection spark-ignition internal combustion engine with a combustion control apparatus in accordance with a sixth embodiment of the present invention. The combustion control apparatus of the sixth embodiment is configured basically as in the first embodiment shown in FIGS. 6 through 8, except a routine to be executed by control unit 35. Control unit 35 is configured to hold the fuel pressure constant.

In this embodiment, the fuel-injection timing is controlled so that fuel injection start timing ITS is set to a desired crank angle. Fuel injection end timing ITE is determined in accordance with fuel injection start timing ITS and the fuel injection quantity. In addition, the ignition timing and the fuel injection timing are adjusted in accordance with the engine temperature such as the coolant temperature, in the TDC injection operating mode.

Figure 25:
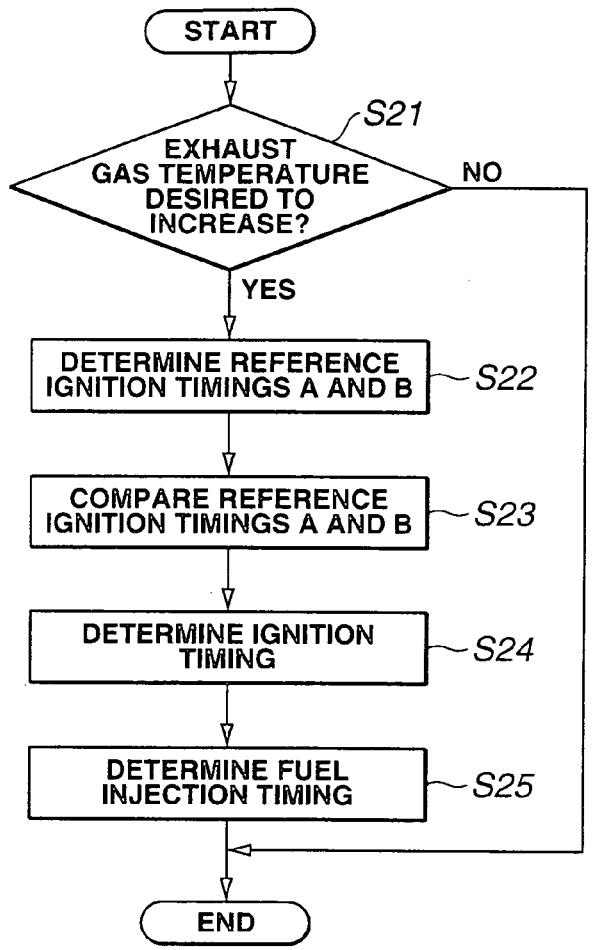
FIG. 25 is a flow chart depicting a routine to be executed by a combustion control apparatus in accordance with a sixth embodiment of the present invention.

FIG. 25 is a flow chart depicting a routine to be executed by control unit 35 in accordance with the sixth embodiment. As shown in FIG. 25, first, at step S21, control unit 35 determines whether or not the exhaust gas temperature is desired to increase, that is, whether or not the engine operating condition is in a condition for the TDC injection operating mode, i.e. in a condition in which the coolant temperature is higher than 80° C. When the answer to step S21 is YES, the routine proceeds to step S22. On the other hand, when the answer to step S21 is NO, the routine returns, and the engine is operated in the normal operating mode, namely in the stratified charge combustion mode or in the homogeneous charge combustion mode. At step S22, control unit 35 determines a first reference ignition timing A which is determined so that the combustion stability is higher than a predetermined threshold, and a second reference ignition timing B which is determined so that the engine is driven by the generated torque against friction. The reference ignition timings A and B are basically in accordance with the coolant temperature. Subsequent to step S22, at step S23, control unit 35 compares reference ignition timings A and B. Subsequent to step S23, at step S24, control unit 35 determines the ignition timing to be earlier one of reference ignition timings A and B. Subsequent to step S24, at step S25, control unit 35 determines the fuel injection timing (fuel injection start timing ITS) in accordance with the ignition timing and the coolant temperature. Control unit 35 may be configured to repeatedly determine the coolant temperature, and to repeatedly determine the ignition timing and the fuel injection timing. Alternatively, in order to simplify the control process, control unit 35 may be configured to determine once the ignition timing and the fuel injection timing in accordance with the coolant temperature that the TDC injection operating mode is started, or the coolant temperature that the engine starts, and to hold the determined settings during the TDC injection operating mode.

Figure 26:
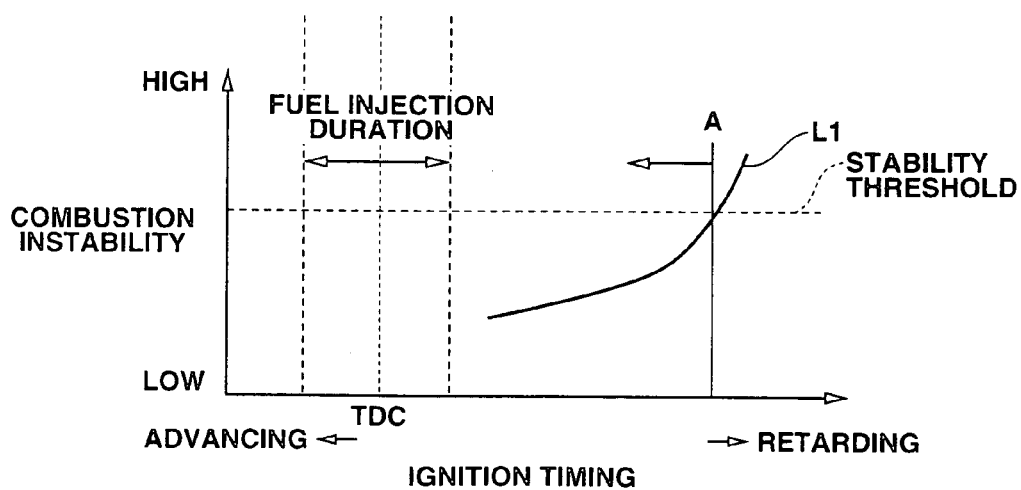
FIG. 26 illustrates how a combustion instability varies with respect to an ignition timing in a direct-injection spark-ignition internal combustion engine.
Figure 27:
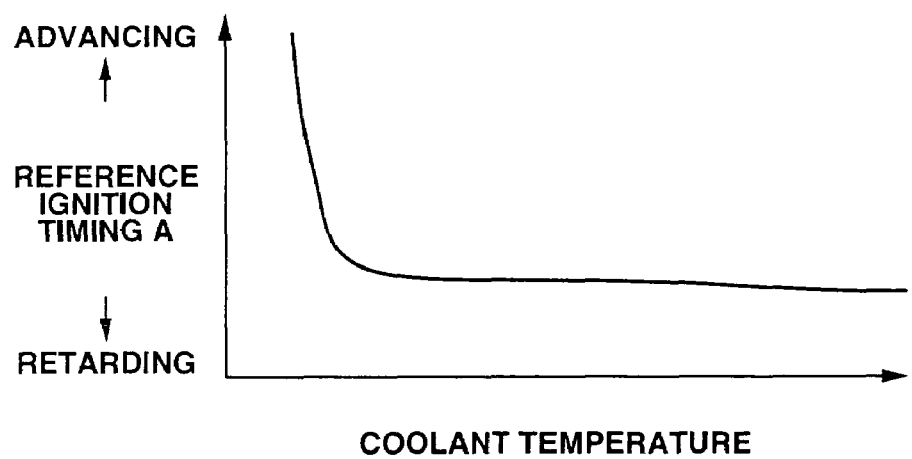
FIG. 27 illustrates how a first ignition timing A varies with respect to a coolant temperature in accordance with the sixth embodiment.

FIG. 26 illustrates how a combustion instability varies with respect to an ignition timing in a direct-injection spark-ignition internal combustion engine. The combustion instability is an indicator opposite to the combustion stability. The line indicated by L1 shows a case of a fixed coolant temperature. As shown in FIG. 26, the combustion instability increases with a delay in the ignition timing. The ignition timing is bounded with a timing that the combustion instability exceeds a combustion stability limit or threshold. First reference ignition timing A is set to the ignition timing of the intersection point between the line L1 and the line indicative of the combustion stability limit, in accordance with the coolant temperature. The characteristic of the line L1 varies with a change in the coolant temperature. The line L1 moves upwardly with a decrease in the coolant temperature. Therefore, the first reference ignition timing A retards with an increase in the coolant temperature, as shown in FIG. 27. At step S22 in the routine of FIG. 25, first reference ignition timing A is basically in accordance with the coolant temperature. In addition to the coolant temperature, first reference ignition timing A may be determined in accordance with other parameters such as the atmosphere temperature which affects the combustion stability.

Figure 28:
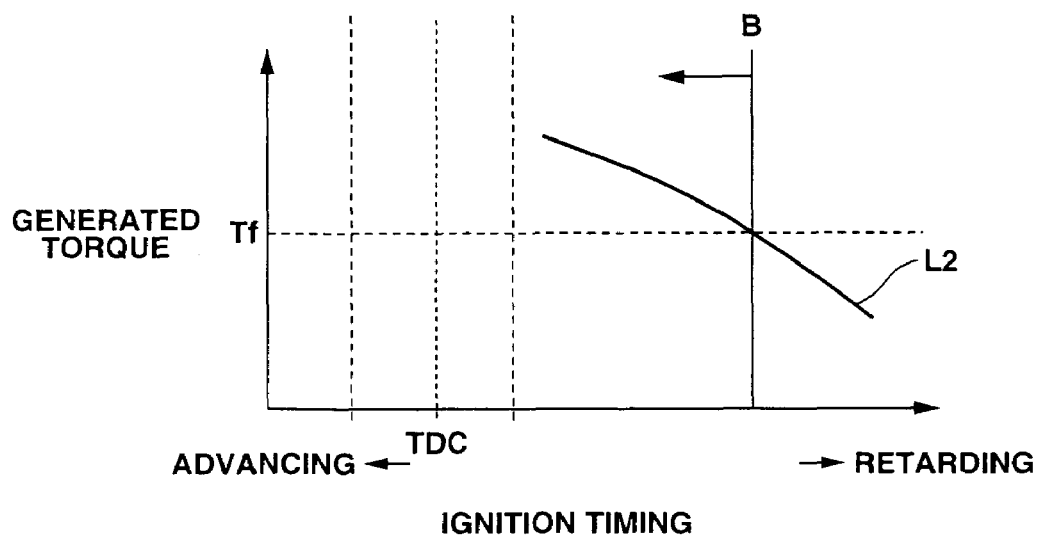
FIG. 28 illustrates how a generated torque varies with respect to an ignition timing in a direct-injection spark-ignition internal combustion engine.
Figure 29A:
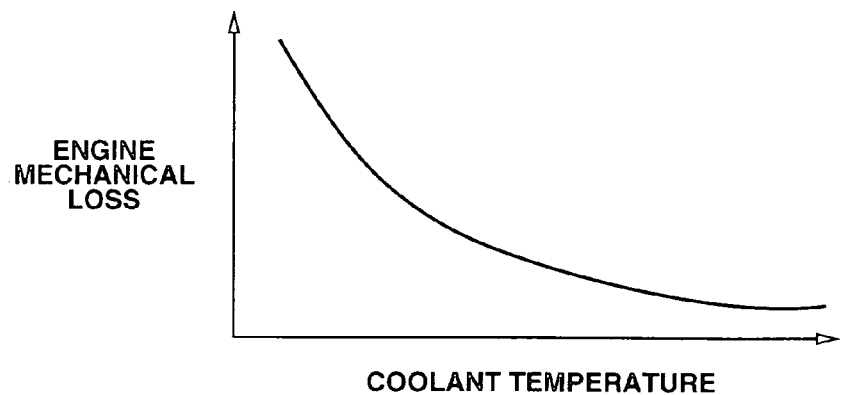
FIG. 29A illustrates how an engine mechanical loss varies with respect to a coolant temperature in a direct-injection spark-ignition internal combustion engine.
Figure 29B:
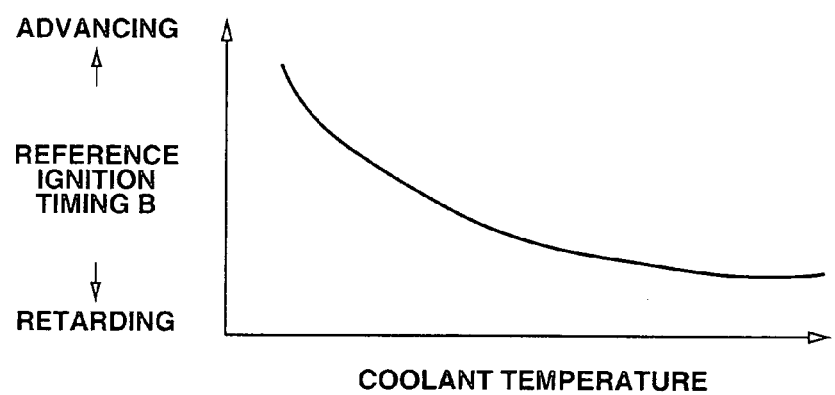
FIG. 29B illustrates how a second ignition timing B varies with respect to the coolant temperature in accordance with the sixth embodiment.

On the other hand, FIG. 28 illustrates how a generated torque varies with respect to an ignition timing in a direct-injection spark-ignition internal combustion engine. The line indicated by Tf represents a minimum torque in a condition of a fixed coolant temperature that is required to operate the engine against frictions within the engine, called a stall limit torque. As shown by the line L2 in FIG. 28, the generated torque decreases with a delay in the ignition timing. The ignition timing is bounded with a timing that the generated torque decreases below the stall limit torque Tf. Second reference ignition timing B is set to the ignition timing of the intersection point between the line L2 and the line Tf, in accordance with the coolant temperature. The characteristic of the line L2 varies with a change in the coolant temperature. As shown in FIG. 29A, friction or mechanical loss within the engine increases with a decrease in the coolant temperature. Accordingly, the line Tf moves upwardly with a decrease in the coolant temperature. Therefore, the second reference ignition timing B advances with a decrease in the coolant temperature, as shown in FIG. 29B. At step S22 in the routine of FIG. 25, second reference ignition timing B is basically in accordance with the coolant temperature. In addition to the coolant temperature, second reference ignition timing B may be determined in accordance with other parameters such as the On-Off state of the auxiliary equipment which affects the friction within the engine.

As mentioned above, at steps S23 and S24, the ignition timing is set to earlier one of reference ignition timings A and B. This timing satisfies the requirements of the combustion stability and the generated torque. Accordingly, even when the engine is in completely cold conditions, the combustion control apparatus controls the engine in the TDC injection operating mode without causing combustion instability or engine stall.

Figure 30:
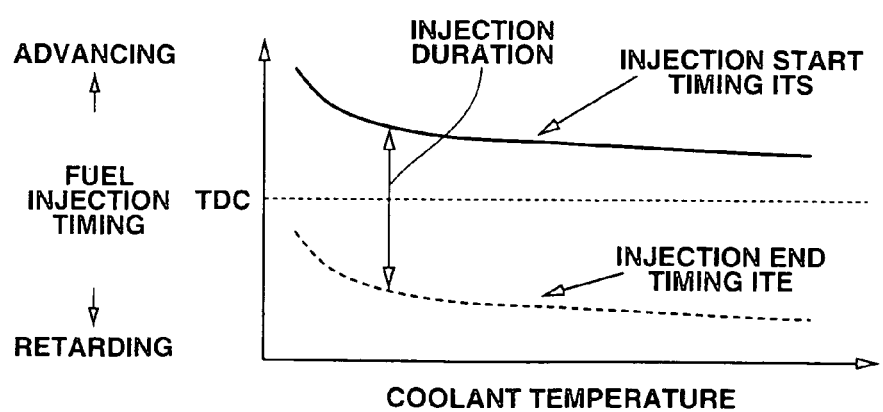
FIG. 30 illustrates how a fuel injection timing varies with respect to the coolant temperature in accordance with the sixth embodiment.

The fuel injection timing or fuel injection start timing ITS is set with respect to the coolant temperature in the TDC injection operating mode as shown in FIG. 30. The fuel injection timing is controlled to advance with a decrease in the coolant temperature. Thus, the fuel injection timing varies with the ignition timing so as to ensure a proper time lag between the fuel injection timing and the ignition timing. With the proper time lag, as the fuel spray moves toward around spark plug 10 to form an ignitable air-fuel mixture around spark plug 10, the air-fuel mixture is ignited assuredly. Alternatively, the fuel injection timing may be determined in accordance with the ignition timing which is determined at step S24.

In this embodiment, the combustion control apparatus is configured to determine the reference ignition timings A and B and to select earlier one of the reference ignition timings. However, it is optional to determine only one of the reference ignition timings and to use the determined timing as it is.

Referring now to FIGS. 31 through 36, there is shown an in-line four cylinder direct-injection spark-ignition internal combustion engine with a combustion control apparatus in accordance with a seventh embodiment of the present invention. The combustion control apparatus of the seventh embodiment is configured basically as in the first embodiment shown in FIGS. 6 through 8, except a routine to be executed by control unit 35. Control unit 35 is configured to hold the fuel pressure constant.

In this embodiment, the fuel-injection timing is controlled so that fuel injection start timing ITS is set to a desired crank angle. Fuel injection end timing ITE is determined in accordance with fuel injection start timing ITS and the fuel injection quantity. Fuel injection start timing ITS and fuel injection end timing ITE may be controlled in accordance with the fuel injection quantity so that the midpoint in fuel injection duration T is identical to compression TDC.

In the TDC injection operating mode, fuel injection start timing ITS, fuel injection end timing ITE, and ignition timing ADV are basically set assuming that the fuel is not heavy gasoline or relatively light gasoline. If the same timing setting is used for heavy fuel, the combustion stability is adversely affected. In this embodiment, ignition timing ADV and the fuel injection timing such as fuel injection start timing ITS are adjusted.

Figure 31:
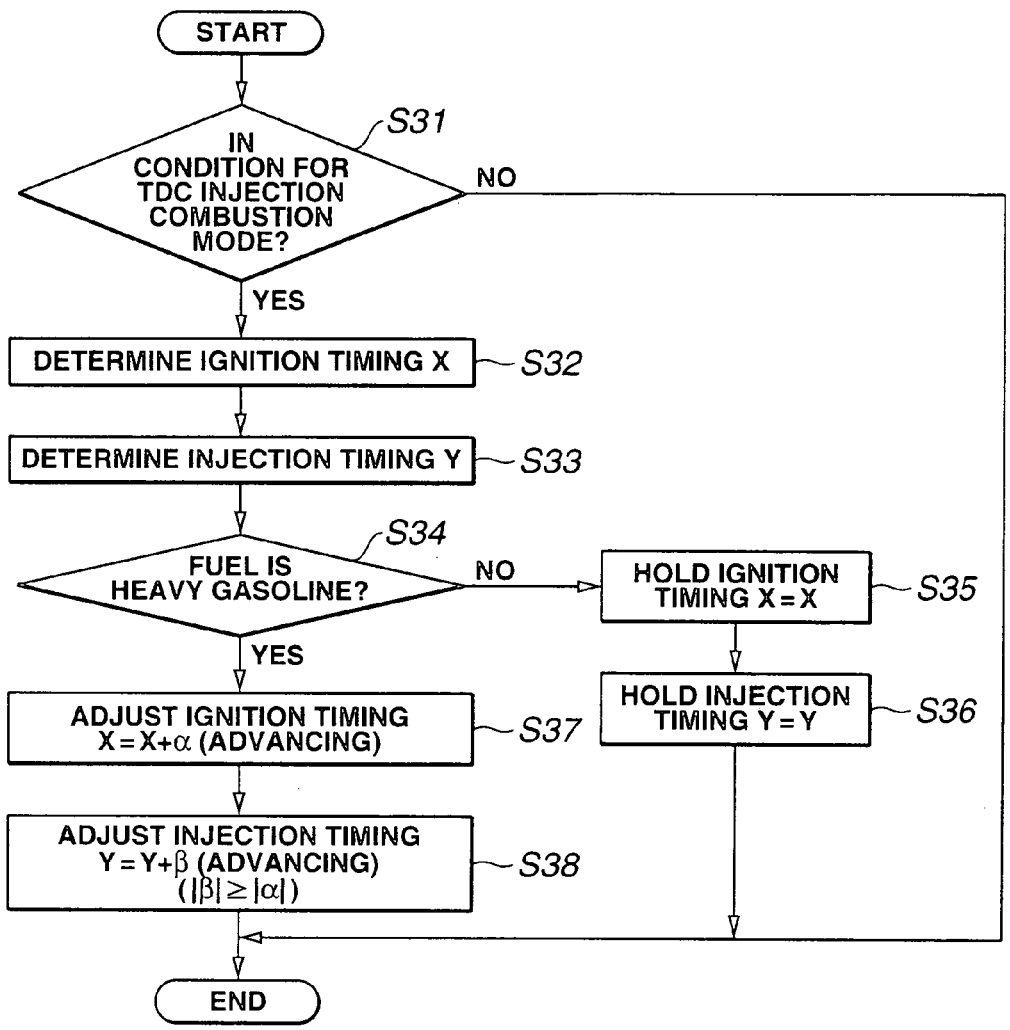
FIG. 31 is a flow chart depicting a routine to be executed by a combustion control apparatus in accordance with a seventh embodiment of the present invention.
Figure 32:
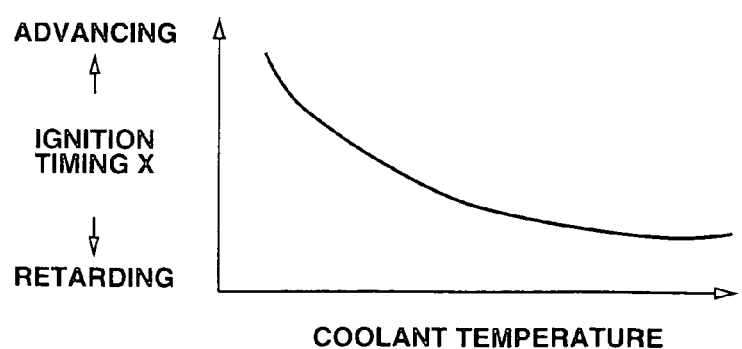
FIG. 32 illustrates how a reference ignition timing X varies with respect to a coolant temperature in accordance with the seventh embodiment.
Figure 33:
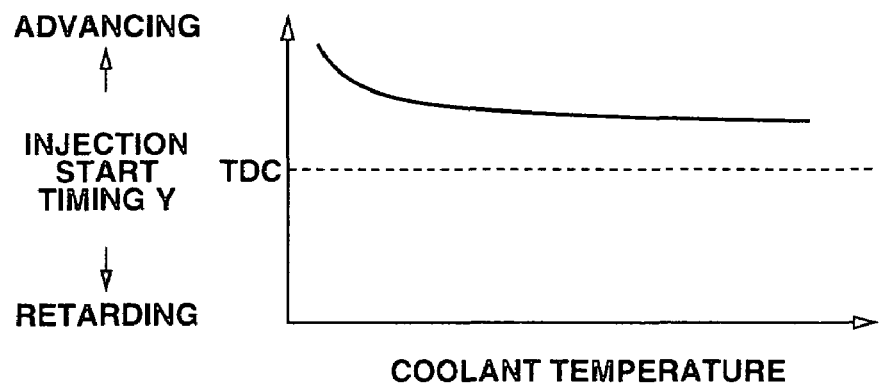
FIG. 33 illustrates how a reference fuel injection timing Y varies with respect to the coolant temperature in accordance with the seventh embodiment.

FIG. 31 is a flow chart depicting a routine to be executed by control unit 35 in accordance with the seventh embodiment. As shown in FIG. 31, first, at step S31, control unit 35 determines whether or not the exhaust gas temperature is desired to increase, that is, whether or not the engine operating condition is in a condition for the TDC injection operating mode, i.e. in a condition in which the coolant temperature is higher than 80° C. When the answer to step S31 is YES, the routine proceeds to step S32. On the other hand, when the answer to step S31 is NO, the routine returns, and the engine is operated in the normal operating mode, namely in the stratified charge combustion mode or in the homogeneous charge combustion mode. At step S32, control unit 35 determines a reference ignition timing X. Reference ignition timing X may be determined by table lookup. As shown in FIG. 32, reference ignition timing X is set to advance with a decrease in the coolant temperature. Subsequent to step S32, at step S33, control unit 35 determines a reference fuel injection start timing Y. Reference fuel injection start timing Y may be determined by table lookup. As shown in FIG. 33, reference fuel injection start timing Y is set to advance with a decrease in the coolant temperature.

Subsequent to step S33, at step S34, control unit 35 determines whether or not the fuel is heavy. This determination may be implemented by means of a method disclosed in a Published Japanese Patent Application No. H9-151777. When the answer to step S34 is YES, the routine proceeds to step S37. On the other hand, when the answer to step S34 is NO, the routine proceeds to step S35. At steps S35 and S36, control unit 35 sets the ignition timing to be reference ignition timing X, and the fuel injection start timing to be reference fuel injection start timing Y.

At step S37, control unit 35 sets the ignition timing to the sum of reference ignition timing X and a predetermined adjustment α so that the ignition timing advances. The adjustment α may be predetermined by experiment. Subsequent to step S37, at step S38, control unit 35 sets the fuel injection start timing to the sum of reference fuel injection start timing Y and a predetermined adjustment β so that the fuel injection timing advances. The adjustment β may be predetermined by experiment. The adjustment β is larger than or equal to the adjustment α. Thus, when the fuel is heavy, the time lag between the injection timing and the ignition timing is adjusted to increase so as to ensure adequate duration for fuel vaporization. This routine of fuel adjustment is once performed at engine start and the result is held until the next engine start.

Figure 34A:
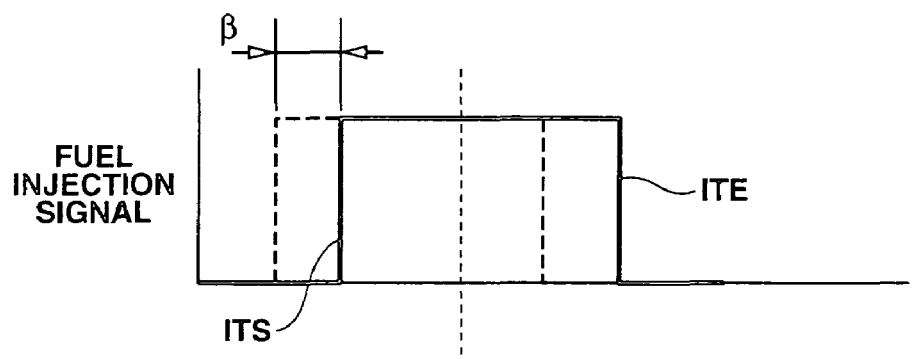
FIGS. 34A and 34B illustrate a sample case of adjusting a fuel injection timing and an ignition timing in accordance with the seventh embodiment.
Figure 34B:
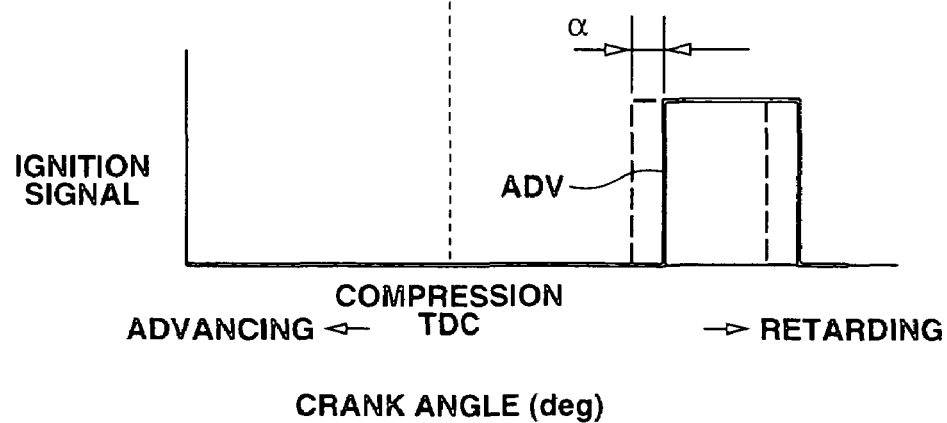

FIGS. 34A and 34B show a sample case of the adjustment of the fuel injection timing and the ignition timing. The solid lines represent a setting for non-heavy fuel. The broken lines represent a setting for heavy fuel. As shown in FIGS. 34A and 34B, when the fuel is heavy, the ignition timing and fuel injection start timing ITS, and fuel injection end timing ITE are adjusted to advance. This results in reducing adverse effects to the combustion stability due to the fuel property.

Figure 35:
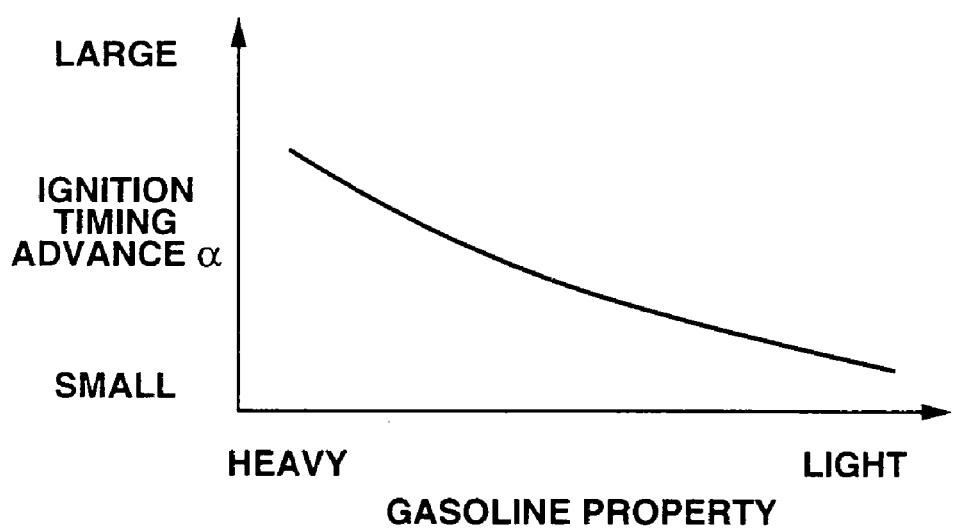
FIG. 35 illustrates how an ignition timing adjustment α varies with respect to a fuel property in accordance with the seventh embodiment.
Figure 36:
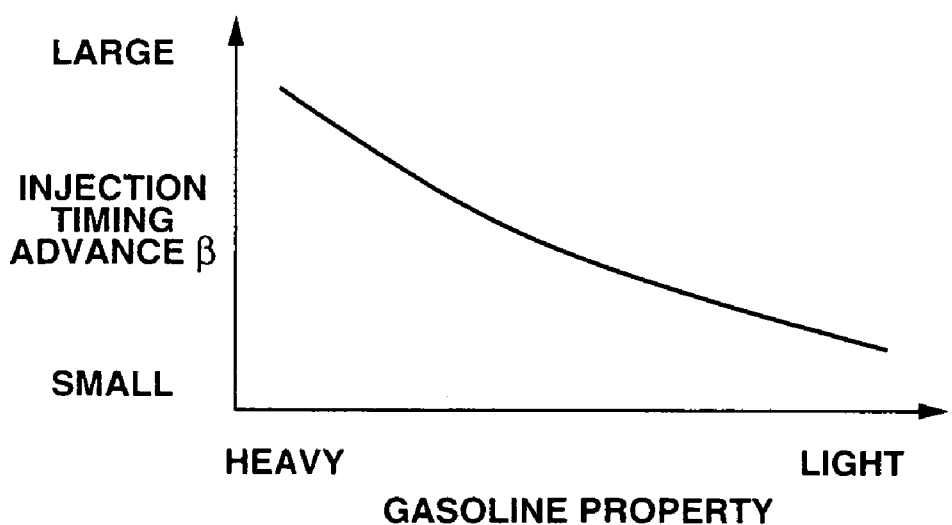
FIG. 36 illustrates how a fuel injection timing adjustment β varies with respect to the fuel property in accordance with the seventh embodiment.

In this embodiment, the adjustments α and β are constant with respect to the fuel property. However, it is optional to determine a degree of heaviness of the gasoline, and to determine the adjustments α and β in accordance with the degree of heaviness of the gasoline. FIG. 35 illustrates how ignition timing adjustment α varies with respect to the fuel property in this modification. The ignition timing adjustment α is set so that the ignition timing advances with an increase in the degree of heaviness of the gasoline. FIG. 36 illustrates how fuel injection adjustment β varies with respect to the fuel property in this modification. The fuel injection adjustment β is set so that the fuel injection timing advances with an increase in the degree of heaviness of the gasoline. The adjustment β is larger than or equal to the adjustment α. Thus, when the fuel is heavy, the time lag between the injection timing and the ignition timing is adjusted to increase so as to ensure adequate duration for fuel vaporization.

In the shown embodiments, fuel injection valve 15 is disposed on the side of combustion chamber 5 with the tip oriented substantially in the horizontal direction, as shown in FIGS. 6 and 7. Alternatively, fuel injection valve 15 may be disposed on a portion of the top surface of combustion chamber 5 surrounded by the intake valves and exhaust valves so that fuel injection valve 15 injects fuel substantially along the vertical direction toward the piston crown of piston 3.

As mentioned above, the combustion control apparatus in accordance with the shown embodiments is effective for stably operating the engine in the TDC injection operating mode in which ignition timing ADV is late after compression TDC, to increase the exhaust gas temperature for rapid activation of the catalyst with reducing the engine-out HC emissions when the engine is in cold conditions.

This application is based on a prior Japanese Patent Application No. 2004-216747 filed on Jul. 26, 2004, a prior Japanese Patent Application No. 2004-226241 filed on Aug. 3, 2004, a prior Japanese Patent Application No. 2004-226240 filed on Aug. 3, 2004, a prior Japanese Patent Application No. 2004-276330 filed on Sep. 24, 2004, a prior Japanese Patent Application No. 2004-356140 filed on Dec. 9, 2004, a prior Japanese Patent Application No. 2004-359282 filed on Dec. 13, 2004, a prior Japanese Patent Application No. 2004-368605 filed on Dec. 21, 2004, and a prior Japanese Patent Application No. 2004-372472 filed on Dec. 24, 2004. The entire contents of these Japanese Patent Applications Nos. 2004-216747, 2004-226241, 2004-226240, 2004-276330, 2004-356140, 2004-359282, 2004-368605, and 2004-372472 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A combustion control apparatus for an internal combustion engine including a combustion chamber, the combustion control apparatus comprising:
   a fuel injector configured to inject fuel into the combustion chamber continuously over a period of time extending from a fuel injection start timing to a fuel injection end timing;
   a spark plug configured to produce a spark in the combustion chamber at an ignition timing; and
   a control unit connected to the fuel injector and the spark plug, for performing the following in a top dead center injection operating mode under a predetermined engine operating condition:
      setting the fuel injection start timing to be before compression top dead center;
      setting the fuel injection end timing to be after compression top dead center;
      setting the ignition timing to be after compression top dead center; and
      performing a penetration control operation of adjusting engine operating parameters of the engine to promote spray penetration of the fuel in the combustion chamber.

2. The combustion control apparatus as claimed in claim 1, wherein the penetration control operation comprises:
   adjusting the fuel injection start timing to advance with an increase in an engine load of the engine.

3. The combustion control apparatus as claimed in claim 2, wherein the penetration control operation comprises:
   holding the fuel injection end timing constant with respect to the engine load.

4. The combustion control apparatus as claimed in claim 2, wherein the penetration control operation comprises:
   adjusting the fuel injection start timing in accordance with the engine load so that an incylinder pressure of the engine at the fuel injection start timing is held constant with respect to the engine load.

5. The combustion control apparatus as claimed in claim 1, wherein the control unit is configured to perform the following in a normal operating mode under normal engine operating conditions except the predetermined engine operating condition:
   setting the fuel injection start timing to be before compression top dead center; and
   setting the fuel injection end timing to be before compression top dead center, and wherein the penetration control operation comprises:
   adjusting a fuel pressure of the fuel injector to be higher than in the normal operating mode.

6. The combustion control apparatus as claimed in claim 5, wherein the penetration control operation comprises:
   adjusting the fuel pressure to increase with an increase in an engine load of the engine.

7. The combustion control apparatus as claimed in claim 5, wherein the penetration control operation comprises:

adjusting the fuel pressure so that a difference in the fuel pressure between the top dead center injection operating mode and the normal operating mode increases with an increase in an engine load of the engine.

8. The combustion control apparatus as claimed in claim 1, wherein the penetration control operation comprises:
adjusting a fuel pressure of the fuel injector to increase with an increase in an engine speed of the engine.

9. The combustion control apparatus as claimed in claim 8, wherein the penetration control operation comprises:
adjusting the fuel pressure to be proportional to a square of the engine speed.

10. The combustion control apparatus as claimed in claim 1, wherein the control unit is configured to inhibit the top dead center injection operating mode during the engine being in a predetermined low temperature condition.

11. The combustion control apparatus as claimed in claim 1, for the engine including a catalytic converter, wherein the control unit is configured to inhibit the top dead center injection operating mode during the catalytic converter being in a predetermined low temperature condition.

12. The combustion control apparatus as claimed in claim 1, wherein the control unit is configured to inhibit the top dead center injection operating mode during an engine load of the engine being high.

13. The combustion control apparatus as claimed in claim 1, wherein the penetration control operation comprises:
adjusting the ignition timing to advance with a decrease in an engine temperature of the engine.

14. The combustion control apparatus as claimed in claim 1, wherein the penetration control operation comprises:
determining whether or not the fuel is heavy; and
advancing the ignition timing when it is determined that the fuel is heavy.

15. The combustion control apparatus as claimed in claim 14, wherein the penetration control operation comprises:
advancing the fuel injection start timing when it is determined that the fuel is heavy.

16. A combustion control apparatus for an internal combustion engine including a combustion chamber, the combustion control apparatus comprising:

fuel injection means for injecting fuel into the combustion chamber continuously over a period of time extending from a fuel injection start timing to a fuel injection end timing;

spark means for producing a spark in the combustion chamber at an ignition timing; and control means for performing the following in a top dead center injection operating mode under a predetermined engine operating condition:
setting the fuel injection start timing to be before compression top dead center;
setting the fuel injection end timing to be after compression top dead center;
setting the ignition timing to be after compression top dead center; and
performing a penetration control operation of adjusting engine operating parameters of the engine to promote spray penetration of the fuel in the combustion chamber.

17. A method of controlling an internal combustion engine including a combustion chamber, a fuel injector configured to inject fuel into the combustion chamber continuously over a period of time extending from a fuel injection start timing to a fuel injection end timing, and a spark plug configured to produce a spark in the combustion chamber at an ignition timing, the method comprising:
performing the following in a top dead center injection operating mode under a predetermined engine operating condition:
setting the fuel injection start timing to be before compression top dead center;
setting the fuel injection end timing to be after compression top dead center;
setting the ignition timing to be after compression top dead center; and
performing a penetration control operation of adjusting engine operating parameters of the engine to promote spray penetration of the fuel in the combustion chamber.

* * * * *